US011783011B1

(12) United States Patent
Lipton et al.

(10) Patent No.: US 11,783,011 B1
(45) Date of Patent: Oct. 10, 2023

(54) ASSET METADATA ORACLE SERVICE FOR FACILITATING DIGITAL ASSET TRADING

(71) Applicant: Numéraire Financial, Inc., Chicago, IL (US)

(72) Inventors: Alexander Lipton, Abu Dhabi (AE); Marsha Lipton, Abu Dhabi (AE); Thomas P. Hardjono, Winchester, MA (US)

(73) Assignee: Numéraire Financial, Inc., Chicago, IL (US)

( * ) Notice: Subject to any disclaimer, the term of this patent is extended or adjusted under 35 U.S.C. 154(b) by 0 days.

(21) Appl. No.: 18/183,019

(22) Filed: Mar. 13, 2023

(51) Int. Cl.
| | |
|---|---|
| *H04L 9/32* | (2006.01) |
| *G06F 21/10* | (2013.01) |
| *G06Q 30/00* | (2023.01) |
| *G06Q 20/38* | (2012.01) |
| *G06Q 20/32* | (2012.01) |
| *G06Q 10/08* | (2023.01) |

(52) U.S. Cl.
CPC ............ *G06F 21/10* (2013.01); *H04L 9/32* (2013.01); *H04L 9/3263* (2013.01); *H04L 9/3213* (2013.01); *H04L 9/3236* (2013.01); *H04L 9/3247* (2013.01)

(58) Field of Classification Search
CPC ....... H04L 9/32; H04L 9/3263; H04L 9/3213; H04L 9/3236; H04L 9/3247; G06F 21/10; G06Q 30/0185
See application file for complete search history.

(56) References Cited

U.S. PATENT DOCUMENTS

| | | | |
|---|---|---|---|
| 2022/0309491 A1* | 9/2022 | Shapiro | ............... H04L 9/50 |
| 2022/0358280 A1 | 11/2022 | Shirani et al. | |
| 2023/0070389 A1* | 3/2023 | Madhusudhan | ... G06Q 20/3276 |

FOREIGN PATENT DOCUMENTS

| | | | | |
|---|---|---|---|---|
| EP | 4160459 A1 | * | 4/2023 | ........... G06Q 30/018 |
| WO | WO-2023278635 A1 | * | 1/2023 | |

OTHER PUBLICATIONS

NFTs—Digital Certificate, License of Use, Ownership—Evelyse Carvalho Ribas, Artlaw, Oct. 18, 2021 https://artlaw.club/en/artlaw/nfts-digital-certificate-license-of-use-ownership-1 (Year: 2021).*

(Continued)

*Primary Examiner* — Randy A Scott
(74) *Attorney, Agent, or Firm* — Nicholson De Vos Webster & Elliott LLP

(57) ABSTRACT

Techniques are described for providing a computer-implemented hybrid asset management platform and related system components used to manage transactions involving "hybrid" assets comprising both digital and physical components. The hybrid asset management platform provides continual synchronization between digital asset certificates of legal ownership (e.g., data structures managed off-chain in one or more private data stores) with corresponding asset non-fungible tokens (NFTs) that are tradeable on a blockchain or other type of decentralized ledger. Among other benefits, the described hybrid asset management platform provides for efficient and secure transactions involving possibly several different types of users, thereby improving the ability for metaverses, gaming platforms, virtual and real-world marketplaces, and other entities to facilitate transactions involving hybrid assets.

20 Claims, 9 Drawing Sheets

(56) References Cited

OTHER PUBLICATIONS

"NFTCert: NFT-Based Certificates with Online Payment Getaway"—Zhao et al., ARXIV, Feb. 19, 2022 https://arxiv.org/pdf/2202.09511 (Year: 2022).*
Alonso, O., et al., "Crowdsourcing a Subjective Labeling Task: A Human-Centered Framework to Ensure Reliable Results", Microsoft Res., Redmond, 2014, 10 pages.
Amare, N., et al., "Seeing Typeface Personality: Emotional Responses to Form as Tone", IEEE International Professional Communication Conference, Oct. 2012, 10 pages.
Barsoum, E., et al., "Training Deep Networks for Facial Expression Recognition with Crowd-Sourced Label Distribution", In Proceedings of the 18th ACM International Conference on Multimodal Interaction, Sep. 24, 2016, 6 pages.
Carneiro, G., et al., "Supervised Learning of Semantic Classes for Image Annotation and Retrieval", IEEE Transactions on Pattern Analysis and Machine Intelligence, vol. 29, No. 3, Mar. 2007, pp. 394-410.
Claude Coulombe, "Text data augmentation made simple by leveraging NLP cloud APIS", arXiv preprint arXiv:1812.04718, 2018, pp. 1-33.
Devlin, J., et al., "BERT: Pre-training of Deep Bidirectional Transformers for Language Understanding", Proceedings of NAACL-HLT, 2019, pp. 4171-4186.
Doyle, J. R., et al., "Dressed for the Occasion: Font-Product Congruity in the Perception of Logotype", Journal of Consumer Psychology, vol. 16, No. 2, 2006, pp. 112-123.
Eva R. Brumberger, "The Rhetoric of Typography: The Awareness and Impact of Typeface Appropriateness", Technical Communication, vol. 50, No. 2, May 2003, pp. 224-231.
Eva R. Brumberger, "The Rhetoric of Typography: The persona of typeface and text", Technical Communication, vol. 50, No. 2, May 2003, pp. 206-223.
Felbo, B., et al., "Using millions of emoji occurrences to learn any-domain representations for detecting sentiment, emotion and sarcasm", arXiv:1708.00524v, Oct. 7, 2017, 13 pages.
Gao, T., et al., "SimCSE: Simple Contrastive Learning of Sentence Embeddings", Computer Science, May 18, 2022, 17 pages.
Geng, X., et al., "Facial Age Estimation by Learning from Label Distributions", IEEE Transactions on Pattern Analysis and Machine Intelligence, vol. 35, No. 10, Oct. 2013, pp. 451-456.
Greene, D., et al., "Using Crowdsourcing and Active Learning to Track Sentiment in Online Media", Research Gate, Jan. 2010, 13 pages.
Henderson, P. W., et al., "Impression Management Using Typeface Design", Conditional Acceptance at the Journal of Marketing, Ms 02-168, Apr. 2004, 36 pages.
Jo Mackiewicz, "Audience Perceptions of Fonts in Projected PowerPoint Text Slides", Technical Communication, vol. 54, No. 3, Aug. 2007, pp. 295-307.
Joseph L. Fleiss, "Measuring Nominal Scale Agreement Among Many Raters", Psychological Bulletin, vol. 76, No. 5, 1971, pp. 378-382.
Juni, S., et al., "Emotional and persuasive perception of fonts", Perceptual and Motor Skills, vol. 106, No. 1, 2008, pp. 35-42.
Kar, S., et al., "Folksonomication: Predicting Tags for Movies from Plot Synopses Using Emotion Flow Encoded Neural Network", In Proceedings of the 27th International Conference on Computational Linguistics, Aug. 15, 2018, 13 pages.
Kingma, D. P., et al., "Adam: A method for stochastic optimization", arXiv:1412.6980v9, Jan. 30, 2017, pp. 1-15.
Kulahcioglu, T., et al., "FontLex: A Typographical Lexicon based on Affective Associations", In Proceedings of the Eleventh International Conference on Language Resources and Evaluation, 2018, pp. 62-69.
Kullback, S., et al., "On Information and Sufficiency", The Annals of Mathematical Statistics, vol. 22, No. 1, Mar. 1951, pp. 79-86.
Mackiewicz, J., et al., "Why People Perceive Typefaces to Have Different Personalities", International Professional Communication Conference, 2004. IPCC 2004. Proceedings, 2004, pp. 304-313.
Mallinson, J., et al., "Paraphrasing Revisited with Neural Machine Translation", Proceedings of the 15th Conference of the European Chapter of the Association for Computational Linguistics, vol. 1, 2017, pp. 881-893.
Mohammad, S. M., et al., "Crowdsourcing a Word-Emotion Association Lexicon", Computational Intelligence, vol. 29, No. 3, Aug. 2013, pp. 1-25.
Nguyen, A. T., et al., "Probabilistic Modeling for Crowdsourcing Partially-Subjective Ratings", Proceedings of the AAAI Conference on Human Computation and Crowdsourcing, vol. 4, 2016, pp. 149-158.
O'Donovan, P., et al., "Exploratory Font Selection Using Crowdsourced Attributes", ACM Transactions on Graphics, vol. 33, No. 4, Article No. 92, Jul. 27, 2014, pp. 1-9.
Pennington, J., et al., "GloVe: Global Vectors forWord Representation", Proceedings of the 2014 conference on empirical methods in natural language processing (EMNLP), 2014, pp. 1532-1543.
Reimers, N., et al., "Sentence-BERT: Sentence Embeddings using Siamese BERT-Networks", Computer Science, Aug. 27, 2019, 11 pages.
Rodrigues, F., et al., "Sequence Labeling with Multiple Annotators", Machine Learning, vol. 95, No. 2, Oct. 4, 2013, pp. 165-181.
Saif, M. Mohammad, "Obtaining Reliable Human Ratings of Valence, Arousal, and Dominance for 20,000 English Words", Proceedings of the 56th Annual Meeting of the Association for Computational Linguistics, vol. 1, 2018, pp. 174-184.
Saif, M. Mohammad, "Word Affect Intensities", Proceedings of the 11th Edition of the Language Re- sources and Evaluation Conference (LREC-2018), 2018, pp. 174-183.
Salminen, J. O., et al., "Inter-Rater Agreement for Social Computing Studies", In 2018 Fifth International Conference on Social Networks Analysis, Management and Security (SNAMS), 2018, 9 pages.
Shinahara, Y., et al., Serif or Sans: Visual Font Analytics on Book Covers and Online Advertisements, International Conference on Document Analysis and Recognition (ICDAR), 2019, 6 pages.
Shirani, A., et al., "Learning Emphasis Selection for Written Text in Visual Media from Crowd-Sourced Label Distributions", Proceedings of the 57th Annual Meeting of the Association for Computational Linguistics, 2019, pp. 1167-1172.
Shirani, A., et al., "Let me Choose: From Verbal Context to Font Selection", Computer Science, 2020, pp. 8607-8613.
Srinivasan, R., et al., "Crowdsourcing in the Absence of Ground Truth—A Case Study", Computer Science, 2019, 7 pages.
Urkullu, A., et al., "On the evaluation and selection of classifier learning algorithms with crowdsourced data", Applied Soft Computing, vol. 80, 2019, pp. 832-844.
Wolf, T., et al., "Transformers: State-of-the-Art Natural Language Processing", Proceedings of the 2020 Conference on Empirical Methods in Natural Language Processing: System Demonstrations, 2020, pp. 38-45.
Xin Geng., "Label distribution learning", IEEE Transactions on Knowledge and Data Engineering, vol. 28, No. 7, 2016, pp. 1-14.
Yang, J., et al., "Leveraging Crowdsourcing Data for Deep Active Learning An Application: Learning Intents in Alexa", Proceedings of the 2018 World Wide Web Conference, 2018, pp. 23-32.
Yang, X., et al., "Deep Label Distribution Learning for Apparent Age Estimation", In Proceedings of the IEEE international conference on computer vision workshops, 2015, 7 pages.

* cited by examiner

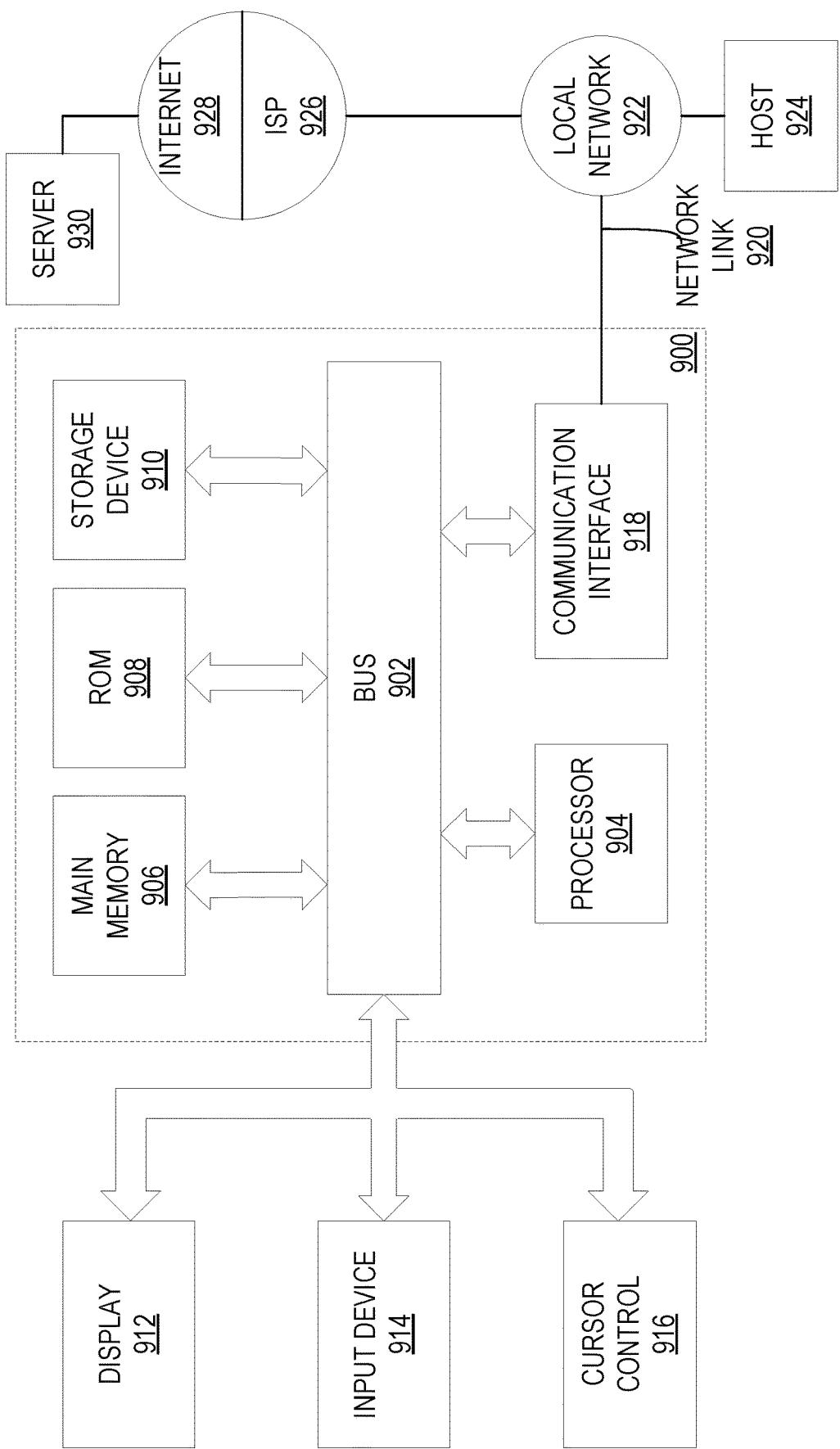

US 11,783,011 B1

ASSET METADATA ORACLE SERVICE FOR FACILITATING DIGITAL ASSET TRADING

BACKGROUND

A non-fungible token is a unique digital item that can be linked to a decentralized ledger such as a blockchain. Today, NFTs are popularly used to represent many different types of digital or physical items such as art, music, luxury goods, etc. There is further a growing interest in the creation, use of, and ability to transfer ownership of such digital and linked physical assets among different entities in a variety of contexts such as in metaverse worlds, gaming platforms, online marketplaces, and the like.

BRIEF DESCRIPTION OF DRAWINGS

Various examples in accordance with the present disclosure will be described with reference to the drawings, in which:

FIG. 9 is a block diagram illustrating an example computer system that may be used in some examples.

DETAILED DESCRIPTION

Figure 1:
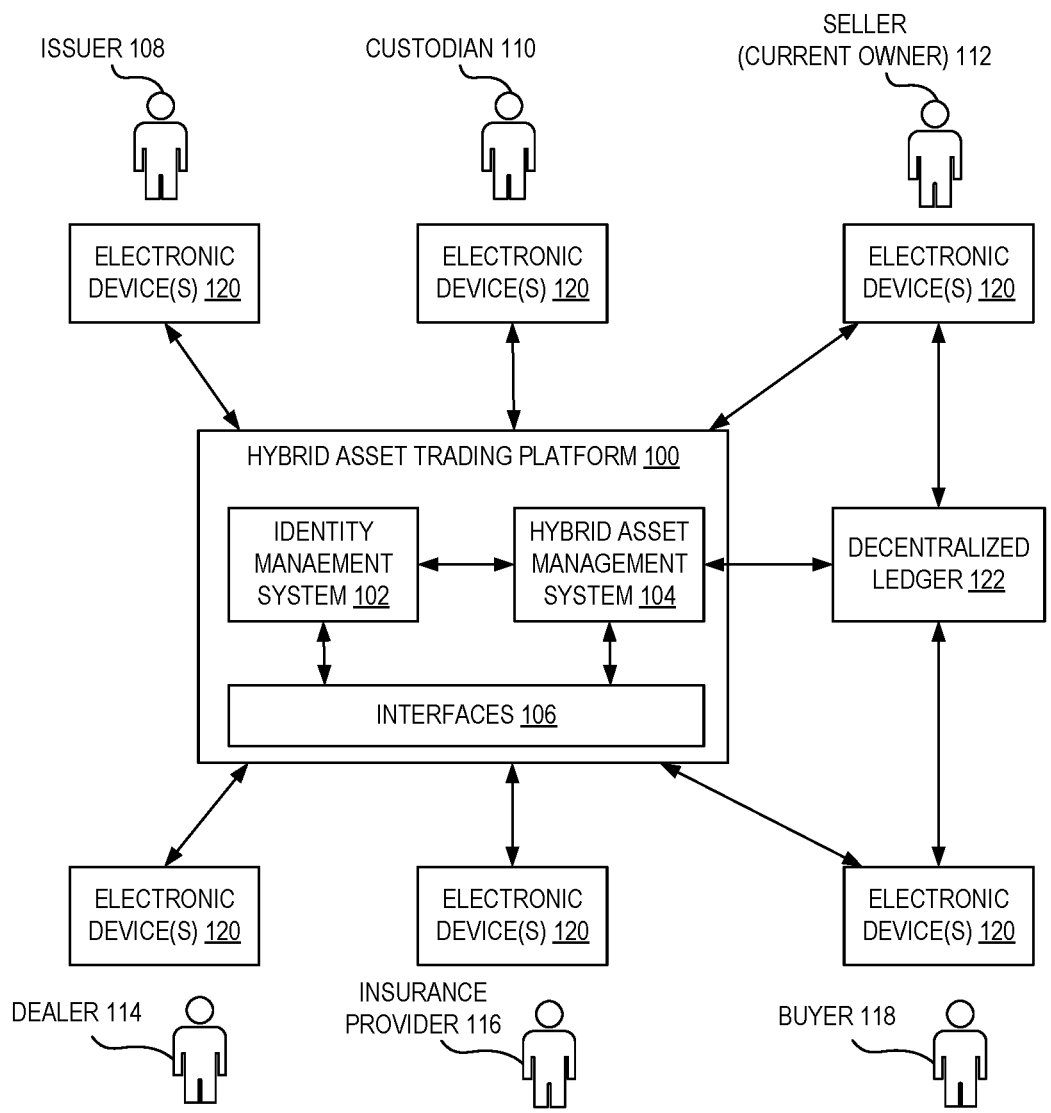
FIG. 1 is a diagram illustrating an overview of a computer-implemented hybrid asset trading platform according to some examples.

The present disclosure relates to methods, apparatus, systems, and non-transitory computer-readable storage media for providing a computer-implemented hybrid asset management platform and related system components used to manage transactions involving "hybrid" assets comprising both digital and physical components. According to examples described herein, the hybrid asset management platform provides continual synchronization between digital asset certificates of legal ownership (e.g., data structures managed off-chain in one or more private data stores) with corresponding asset non-fungible tokens (NFTs) that are tradeable on a blockchain or other type of decentralized ledger. In some examples, an asset certificate of legal ownership is a digital representation of physical goods or other assets in the real world, and the three parts the physical asset, the asset certificate of legal ownership, and an asset NFT—comprise a hybrid asset. Among other benefits, the described hybrid asset management platform provides for efficient and secure transactions involving possibly several different types of users, thereby improving the ability for metaverses, gaming platforms, virtual and real-world marketplaces, and other entities to facilitate transactions involving hybrid assets.

There is a growing interest in the creation and trading of digital hybrid assets that represent real-world physical assets. As indicated above, these hybrid assets can be created and traded in metaverses and other virtual worlds, gaming platforms, virtual and real-world marketplaces, among other possible places. A unique aspect of a hybrid asset is its combination of a physical asset with a decentralized ledger-based token (e.g., a token stored on a blockchain), where it is desired for ownership or possession of both the physical asset and the token to be consistent over time. For example, under normal circumstances, a change of ownership of a token from one entity to another is to result in the change of ownership (and possession) of the physical asset, and vice versa.

One existing approach for representing physical assets (e.g., luxury goods, baskets of commodities, real estate, etc.) on a blockchain or other type of decentralized ledger is by using non-fungible tokens (NFTs). Broadly, an NFT is a unique digital asset that is stored on a blockchain or other type of decentralized ledger and can be used to represent one or more digital items, one or more real-world physical items, or combinations of both. In some cases, when an NFT is bought and sold on the blockchain from a seller (i.e., the initial owner of the NFT) to a buyer, the buyer and seller might often desire for ownership of any corresponding physical assets to also transfer from the seller to the buyer. However, an NFT-only approach generally fails to account for the possibility that a physical asset corresponding to an NFT may be bought and sold in the real-world outside of the blockchain without regard for the status of the NFT, thus making NFTs alone deficient as a tool for managing such transactions. Similarly, for certain types of portable luxury goods (e.g., luxury fashion items, luxury automobiles, etc.) of high value, there are additional concerns that an individual who is the current legal owner of the physical goods (and who possesses the physical goods) might fail to deliver the physical goods to the buyer upon the sale or transfer of a corresponding NFT. In this case, the result is an inconsistency between what is reflected by the NFT on the blockchain (e.g., a buyer owns the token formerly owned by a seller) with the reality in the physical world (e.g., a seller still in possession of the physical goods). These challenges, among others, are addressed by the hybrid asset trading platform described herein, including related system components such as an asset metadata oracle service, which enable secure transactions involving hybrid assets to be performed.

In some examples, a hybrid asset can generally include one or more real-world physical items that are represented electronically using two interconnected data structures: a digital certificate of legal ownership stored off-chain in a private database or other storage resource managed by a hybrid asset trading platform, and a digital NFT token located on a blockchain or other type of decentralized ledger.

In some examples, a certificate of legal ownership (or "CLO," or certificate of ownership) is a data structure (e.g., a file) that contains relevant information about (a) a physical asset or a collection of physical assets that the certificate of legal ownership represents, and (b) a current legal owner or group of owners of the physical asset(s) in the real world. The certificate of legal ownership can be implemented using digital certificates (e.g., based on the X.509 standard, JavaScript Object Notation (JSON) standard, etc.) with extension fields, for example, to carry additional information identifying one or more corresponding physical assets, owners of the physical asset(s), a physical location of the physical asset(s), and the like. In some examples, a certificate of legal ownership can be stored by a hybrid asset management system in a private database or other storage resource "off-chain" (i.e., not on a blockchain or other type of public decentralized ledger), where access to the private database or other storage resource can be limited to only certain entities. In some examples, a certificate of legal ownership is cryptographically signed using a private key of a public-private key pair associated with its issuer, thereby providing integrity protection against unauthorized modifications.

In some examples, a certificate of legal ownership can be generated in at least two different forms including: a "plain" (or non-keyed) certificate of legal ownership (e.g., a plain certificate of legal ownership that does not carry any cryptographic keys associated with the certificate), or a "keyed" certificate of legal ownership (e.g., a keyed certificate of legal ownership that carries a public key whose matching private key is in the possession of the legal owner of the hybrid asset, where the public-private key pair can be referred to as a "proof of possession" key pair).

In some examples, and as described in more detail herein, a hybrid asset management system can store NFTs representing physical items as data structures on a blockchain or other type of decentralized ledger, where an NFT is cryptographically bound to a matching certificate of legal ownership. For example, an NFT stored by the hybrid asset management system can include, as part of the NFT data structure, data contained in or derived from the certificate of legal ownership (such as, e.g., an identifying asset serial number, a hash of an entire certificate of legal ownership, etc.). Thus, in some examples, the hybrid asset management system creates a one-to-one correspondence between an NFT and a corresponding certificate of legal ownership, each associated with the hybrid asset. In some examples, an NFT representing a hybrid asset is recorded on a decentralized ledger (e.g., a public or private blockchain or other type of decentralized ledger) associated with a specific address (e.g., a blockchain address) of its owner and is controlled by the cryptographic private key of its owner. An NFT can be assigned by its current owner (e.g., as a seller of the hybrid asset) to another entity (e.g., a buyer of the hybrid asset) on the blockchain by its current owner using a computing device to assign the NFT to the address of the buyer.

In some examples, when an NFT representing a hybrid asset is traded, sold, or otherwise transferred on the blockchain from a first entity to a second entity (e.g., from one person to another), the hybrid asset management platform updates the ownership information in the corresponding certificate of legal ownership associated with the hybrid asset. As described in more detail herein, responsive to the transfer of ownership of a NFT, in some examples, a hybrid asset management platform can create a new certificate of legal ownership identifying the buyer and revoking the certificate of legal ownership associated with the previous owner. However, the continuous synchronization of the digital representation of a hybrid asset using both a NFT and certificate of legal ownership presents challenges, which are addressed by components of the hybrid asset management system described in more detail herein. Furthermore, the hybrid asset management platform described herein addresses challenges related to sales or trades of one or more physical asset(s) in the real world, where those assets correspond to an NFT/certificate of legal ownership managed by the platform, where both the corresponding certificate of legal ownership and NFT are to be updated to reflect the real-world change of ownership.

FIG. 1 is a diagram illustrating an overview of a computer-implemented hybrid asset trading platform according to some examples. As shown, the hybrid asset trading platform 100 includes an identity management system 102 and a hybrid asset management system 104. As further shown, many different types of entities can interact with a hybrid asset trading platform 100 via interfaces 106. These entities can include, for example, issuers (e.g., an issuer 108), custodians (e.g., a custodian 110), sellers (e.g., a seller 112), dealers (e.g., a dealer 114), insurance providers (e.g., an insurance provider 116), and buyers (e.g., a buyer 118). Examples of these and other types of entities' interactions with a hybrid asset trading platform are described in more detail elsewhere herein.

The interfaces 106 associated with a hybrid asset trading platform 100 can include, e.g., application programming interfaces (APIs), web-based interfaces, and the like. For example, users can access and interact with the hybrid asset trading platform 100 and other system components using electronic device(s) 120 through API calls, via a client software application or website, or other type of interface. Here, an API broadly refers to a communication protocol between a client electronic device 120 (e.g., a desktop computer, laptop, mobile device, etc., or other type of computing device) and a server (e.g., hosting some or all of the hybrid asset trading platform 100), where the client can make requests over one or more networks (including, e.g., the public internes) in one or more defined formats and the server can send a response in a specific format or initiate a defined action. For example, the hybrid asset trading platform 100 can provide APIs for initiating the registration of user accounts, registering hybrid assets with the platform, mediating aspects of authenticating users, facilitating sales or trades of registered assets, and the like.

When a user (e.g., a manufacturer of some type of physical asset or physical item), as the current legal owner of a physical asset, seeks to create an NFT representing the physical asset on a blockchain or other type of decentralized ledger, the user can use a hybrid asset trading platform 100 to register as a user of the platform and to further register the physical asset in question (e.g., identified in part by a unique serial number or other type of identifier) into the platform. In some examples, the hybrid asset trading platform 100 facilitates the creation and subsequent management of certificates of legal ownership and NFTs corresponding to such physical assets, such that the state of the three components for an asset (the physical asset, the certificate of legal ownership, and the NFT) can be continuously synchronized. When an NFT representing a physical asset managed by the hybrid asset trading platform 100 changes ownership on the blockchain, then the hybrid asset trading platform 100 can ensure that a matching asset certificate of ownership in a private database of the hybrid asset trading platform 100 is also updated. Similarly, when the physical asset changes ownership in the real-world, then the hybrid asset trading platform 100 can ensure that the matching asset certificate and asset NFT are also updated to reflect this change.

In some examples, entities that use the hybrid asset trading platform 100 or are otherwise involved in transactions managed by the hybrid asset trading platform can create an account with the platform. The account can be associated with credentials (e.g., a username and password) that enable entities to authenticate themselves with the platform. The hybrid asset trading platform 100 can further maintain identity information and permissions information associated with user accounts using, e.g., an identity management system 102 to ensure that only authorized entities can perform certain operations via a hybrid asset trading platform 100.

In some examples, an entity who first introduces a physical asset to be managed by the hybrid asset trading platform 100 can be referred to as an issuer 108. Examples of an issuer 108 can include, for example, product manufacturers, brand owners, and other creators of physical goods and other items. In some examples, an issuer 108 can be assumed to be the initial owner of a hybrid asset that does not yet exist in the hybrid asset trading platform 100.

To ensure that physical assets managed by the hybrid asset trading platform 100 remain in known locations, in some examples, a custodian 110 of a physical asset managed by the hybrid asset trading platform 100 holds the physical asset in safekeeping. For a given physical asset, in some examples, a custodian 110 can electronic device(s) 120 to provide data and signed assertions (or statements) of assurance into the hybrid asset trading platform 100 regarding the fact that it is holding the physical asset, including the date and time when the physical asset began to be in its possession. In some examples, the data and signed assertations can be provided automatically by systems under the control of a custodian 110.

When a current owner of a hybrid asset seeks to sell, trade, or otherwise transfer ownership of a hybrid asset to another entity (e.g., a potential buyer 118), in some examples, the owner can use an NFT-based representation of the hybrid asset to facilitate the transaction (e.g., by transferring ownership of the NFT to the buyer 118). However, prior to conducting any transaction transferring ownership of the NFT, in examples, the owner (or seller 112) first delivers (or surrenders) the corresponding physical asset to a custodian 110. Once the custodian 110 is in possession of the physical asset, the custodian can use an interface 106 via an electronic device 120 to register this information with the hybrid asset trading platform. The registration of the physical asset can include, for example, providing attributes of the physical asset and information about the condition of the physical asset (e.g., whether the asset is in great, good, or poor condition, etc.), where the hybrid asset trading platform 100 can store this information in associated with the digital representations of the asset.

In some examples, a dealer 114 can optionally perform an authenticity verification (e.g., a process to determine whether a physical item is authentic or counterfeit) of certain types of physical assets (e.g., luxury goods, luxury automobiles, etc.). The dealer 114 can work in conjunction with the custodian 110 and, in some cases, the dealer 114 can act as the custodian 110 (e.g., both roles can be performed by the same entity). For certain types of physical assets (e.g., branded luxury goods), a dealer 114 can also serve as the authoritative source of provenance information regarding the history of the physical asset and its ownership. This is because a dealer 114, for example, can potentially act as a legal distributor of goods (e.g., luxury goods, commodities, etc.) on behalf of a manufacturer or brand owner. In some examples, a dealer 114 can also keep records of the sale of physical assets to certain customers, who may later return to place the physical asset into custody by the dealer 114 (e.g., when the customer takes on the role of the current owner in a trade to another entity). Thus, the current owner of a physical asset can in some cases deliver a physical asset to a dealer 114 so that the dealer can verify the physical asset's authenticity (e.g., particularly for items susceptible to counterfeiting such as high-value luxury consumer goods). In some examples, a physical item (e.g., a luxury item) includes a tamper-resistant microchip embedded in the physical item, where the tamper-resistant microchip stores a digital certificate identifying the asset management platform.

In some examples, an insurance provider 116 can use a computing device 120 to provide evidence into the hybrid asset trading platform 100 of the insurance of a given physical asset. For certain types of physical assets (e.g., physical artworks, luxury automobiles, etc.), a potential purchaser of a physical asset may desire assurance that the physical asset has been insured by the owner. This may relevant, for example, after a successful trade where physical assets are to be physically transported from an owner or a dealer to another geographic location.

Figure 2:
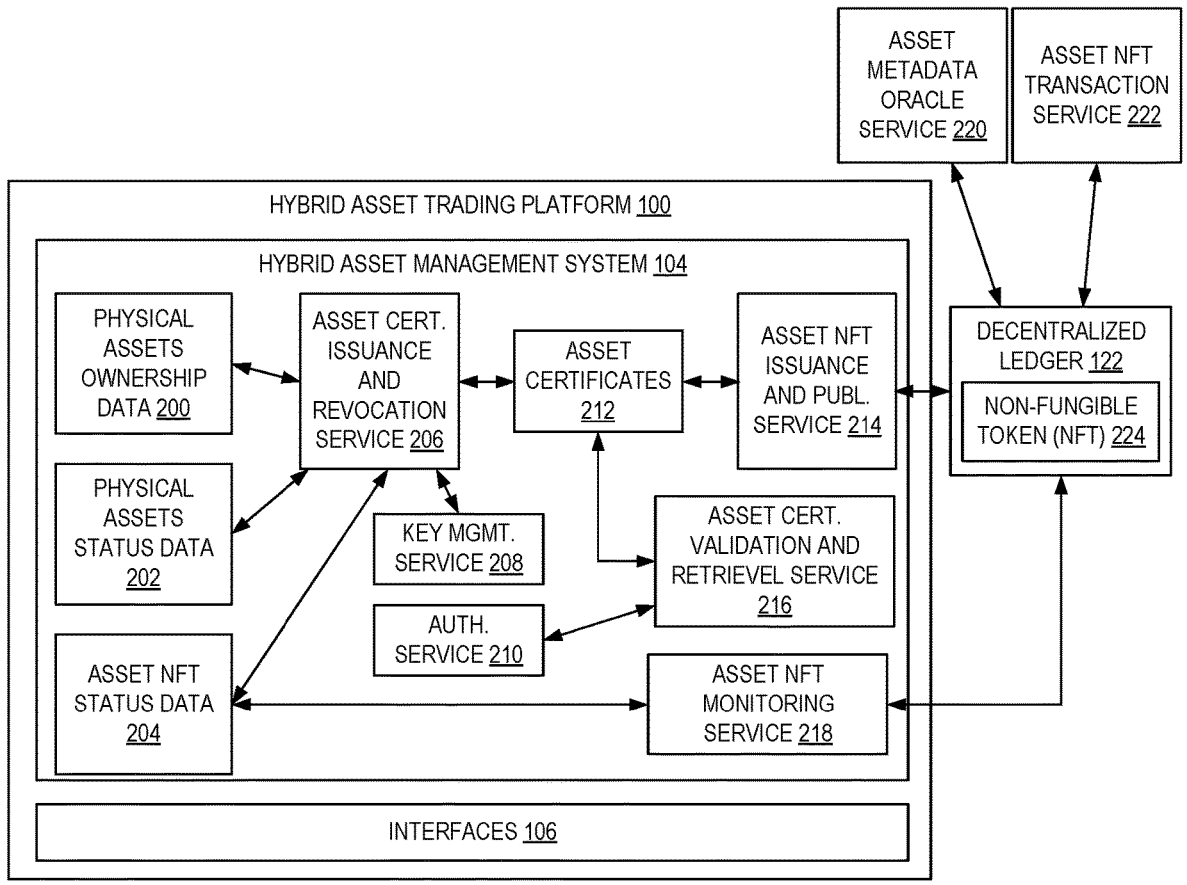
FIG. 2 is a diagram illustrating example components of a hybrid asset management system according to some examples.

FIG. 2 illustrates additional details of a hybrid asset management system component of a hybrid asset management system according to some examples. In some examples, a hybrid asset management system 104 includes several services, data stores, and other components, each of which can be implemented using resources provided by a cloud provider network, using on-premises resources in a datacenter or other location, or a combination of both. For example, a hybrid asset management system 104 and related components can be implemented as software running as part of a virtual machine (VM), container, code executed on demand, or software in any other form running on cloud-based resources or on-premises computing hardware.

In some examples, the hybrid asset management system 104 protects the integrity of certificates of legal ownership against unauthorized changes by digitally signing the files or other data structures containing the certificates of legal ownership. The hybrid asset management system 104 can apply this type of integrity protection in both the cases of "plain" certificates of legal ownership and "keyed" certificates of legal ownership. In these examples, the hybrid asset management system 104 stores a matching integrity protection private key, and the hybrid asset management system 104 can optionally sign multiple certificates of legal ownership using same integrity protection private key.

In the example of a "keyed" certificate of legal ownership, the body of the certificate of legal ownership includes an additional public key of ownership (referred to as a proof-of-ownership public key), which is unique for that certificate of legal ownership. The hybrid asset management system 104 securely delivers the matching proof-of-ownership private key to the current legal owner of the hybrid asset. The proof-of-ownership private key is later used by the owner to prove that they are the legal owner of the hybrid asset by way of a challenge-response protocol between the owner and a challenger entity.

As shown in FIG. 2, the components of a hybrid asset management system 104 can include physical assets ownership data 200, physical assets status data 202, asset NFT status data 204, an asset certificate issuance and revocation service 206, a key management service 208, an authorization service 210, asset certificates 212, an asset NFT issuance and publishing service 214, an asset certificate validation and retrieval service 216, and an asset NFT monitoring service 218. In association with the decentralized ledger 122, FIG. 2 further illustrates an asset metadata oracle service 220 and an asset NFT transaction service 222, each described in more detail herein. FIG. 2 further illustrates an example NFT 224 stored using the decentralized ledger 122, where the NFT 224 for example may correspond to an asset certificate 212 as described in more detail herein.

In some examples, the physical assets ownership data 200 (which can be stored by the hybrid asset management system 104 in a relational database or other type of data store) includes data about physical assets that have been registered by users using the hybrid asset management system 104. For example, users can register the physical assets using a web-based console, API, or other interface 106 provided by the hybrid asset trading platform 100. In some examples, the physical assets ownership data 200 can include information about characteristics of the physical assets and further can include information about one or more owners of each of the physical assets. In some examples, a hybrid asset management system 104 can control access to the physical assets ownership data 200 using permissions controls, encryption, or other security measures or combinations thereof.

In some examples, the physical assets status data 202 includes data reflecting a physical status of physical assets registered with the hybrid asset management system 104 (e.g., physical assets represented by data stored as physical assets ownership data 200). The information stored as part of physical assets status data 202 can include a description of each physical asset, an identifier of a current physical location of each physical asset, an identifier of an entity currently in possession of each physical asset, a custodian of each physical asset (if any), among other possible information. The hybrid asset management system 104 can similarly control access to the physical assets status data 202 using permissions controls or other mechanisms.

In some examples, the asset certificate issuance and revocation service 206 performs processes including issuing digital asset certificates of legal ownership, which includes digitally signing asset certificates of legal ownership (for integrity protection, as described elsewhere herein) using a private key known only to the hybrid asset management system 104. In some examples, each asset certificate of legal ownership (such as, e.g., asset certificates 212) is associated with a unique serial number (which can include, e.g., a random number generated by the hybrid asset management system 104). In some examples, the hybrid asset management system 104 includes a signing public key in each asset certificate of legal ownership to permit other entities to verify the authenticity of the certificates of legal ownership. In some examples, the hybrid asset management system 104 manages the private keys used to sign the asset certificates of legal ownership using a key management service 208 included as part of the asset certificate issuance and revocation service 206, or as a separate service of the hybrid asset management system 104. For example, in some examples, the key management service 208 can be used by the asset certificate issuance and revocation service 206 to manage the cryptographic keys used to sign asset certificates of legal ownership and NFTs representing the assets.

In some examples, the hybrid asset management system 104 stores asset certificates 212 of legal ownership in a database or other type of datastore. The stored assets certificates 212 of legal ownership include, for example, asset certificates 212 of legal ownership \that have been issued by the hybrid asset management system 104 responsive to requests to register the assets. The stored asset certificates 212 of legal ownership information can include currently valid asset certificates of legal ownership, expired asset certificates of legal ownership, and revoked asset certificates of legal ownership, among other possible information.

In some examples, the asset NFT issuance and publishing service 214 includes functionality enabling the issuance of asset NFTs corresponding to valid asset certificates of legal ownership stored as part of asset certificates 212 of legal ownership. In some examples, an asset NFT (e.g., NFT 224) includes a serial number that identifies a corresponding asset certificate 212 of legal ownership. The asset NFT issuance and publishing service 214 can use, in some examples, the key management service 208 described herein to sign asset NFTs using a private key that is specific to that asset NFT. The matching public key can then, for example, be included in the asset NFT. The asset NFT issuance and publishing service 214 also publishes the asset NFT to a blockchain or other type of decentralized ledger 122, where the asset NFTs are addressed to the user who owns the hybrid asset (e.g., to the owner's blockchain address or other identifying address).

In some examples, an asset metadata oracle service 220 (which can be implemented as a smart contract on a blockchain or other decentralized ledger, or as any other type of software-based service running on computing resources provided by a cloud provider or within any other type of computing environment) records metadata (e.g., data related to transactions) onto the decentralized ledger 122. In some examples, the asset NFT issuance and publishing service 214 invokes the asset metadata oracle service 220 to record relevant publicly-readable metadata regarding asset certificates 212 and asset NFTs (e.g., NFT 224).

As described in more detail herein, the data stored by the asset metadata oracle service 220 can be used by an asset NFT transaction service 222, which can also be implemented as a smart contract or other type of executable software-based service. In some examples, the asset NFT transaction service is created by an operator of the hybrid asset trading platform 100 and is and managed by components of the hybrid asset management system 104. For example, in implementations in which the asset NFT transaction service 222 is a smart contract, the address of the smart contract can belong to the hybrid asset management system 104. In general, the asset NFT transaction service 222 can be used by an owner of an NFT (e.g., NFT 224, representing ownership of a hybrid asset) to sell, trade, or otherwise invoke a transaction involving a hybrid asset to another entity (e.g., a buyer 118) on a decentralized ledger 122. In some examples, transactions involving any NFT originating from the hybrid asset management system 104 can be sold, traded, or otherwise transacted upon using asset NFT transaction service 222, the code of which is controlled by an operator of the hybrid asset management system 104.

In some examples, an asset certificate validation and retrieval service 216 permits external entities to query the validity of an asset certificate 212 based on a serial number of the certificate (e.g., included in a corresponding NFT 224 on the decentralized ledger 122). A computing device or other service invoking the asset certificate validation and retrieval service 216 includes a copy of the NFT (accessible from the decentralized ledger 122) to a service endpoint for the asset certificate validation and retrieval service 216. In some examples, responsive to an invocation of the asset certificate validation and retrieval service 216, the service returns a response based on the known information associated with the corresponding asset certificate 212. In some examples, if a requesting client device or other service provides a valid authorization ticket obtained from an authorization service 210, the asset certificate validation and retrieval service 216 can send a response including a copy of the corresponding asset certificate 212.

In some examples, an authorization service 210 enables computing devices or other services (e.g., a software application used by a potential buyer of an NFT) to obtain authorization from a current owner of an asset NFT to obtain a copy of the corresponding asset certificate 212. For example, responsive to a request to allow a buyer to obtain information about an asset certificate 212, the authorization service 210 can provide an authorization ticket to a requesting client device or service. In some examples, the client device or service can then generate a request including the authorization ticket and send the authorization ticket to the asset certificate validation and retrieval service 216. The asset certificate validation and retrieval service 216 can then validate the request and authorization ticket and, if validated, return a copy of the requested asset certificate 212.

In some examples, an asset NFT monitoring service 218 performs ongoing or periodic monitoring of records on a decentralized ledger 122 to detect changes to NFTs (e.g., NFT 224) issued and managed by the hybrid asset management system 104. In some examples, upon detecting an update to an NFT managed by the hybrid asset management system 104, the asset NFT monitoring service 218 records data reflecting the update as asset NFT status data 204, which can be stored in a database or other type of data store.

In some examples, the asset NFT status data 204 includes data associated with asset NFTs issued and managed by the hybrid asset management system 104, including the NFTs current status on a decentralized ledger 122. In some examples, the asset NFT status data 204 can be used by the asset certificate issuance and revocation service 206 to replace (e.g., revoke and reissue) asset certificates 212 in the hybrid asset management system 104. In the case of a change of ownership to a given NFT on the decentralized ledger 122 (e.g., a new owner acquiring an NFT on the decentralized ledger 122 from a previous owner), the asset certificate issuance and retrieval service 216 can: (i) revoke a current asset certificate 212 corresponding the NFT (e.g., containing information associated with the previous owner), and (ii) issue a replacement asset certificate 212 (e.g., containing information associated with the new owner of the NFT). In some examples, the serial number of the original certificate and the replacement asset certificate remains the same.

Issuing Digital Asset Certificates and Corresponding Asset NFTs

In some examples, an entity who uses a computing device to cause the hybrid asset management system 104 to issue a digital asset certificate 212 and its corresponding asset NFT can be referred to as the issuer (e.g., an issuer 108). An issuer 108 generally bases its issuance of certificates using correct data regarding the corresponding physical asset. In some examples, an issuer 108 uses the hybrid asset management system 104 to create and manage digital asset certificates 212 and the corresponding asset NFTs, as described in more detail herein.

Figure 3:
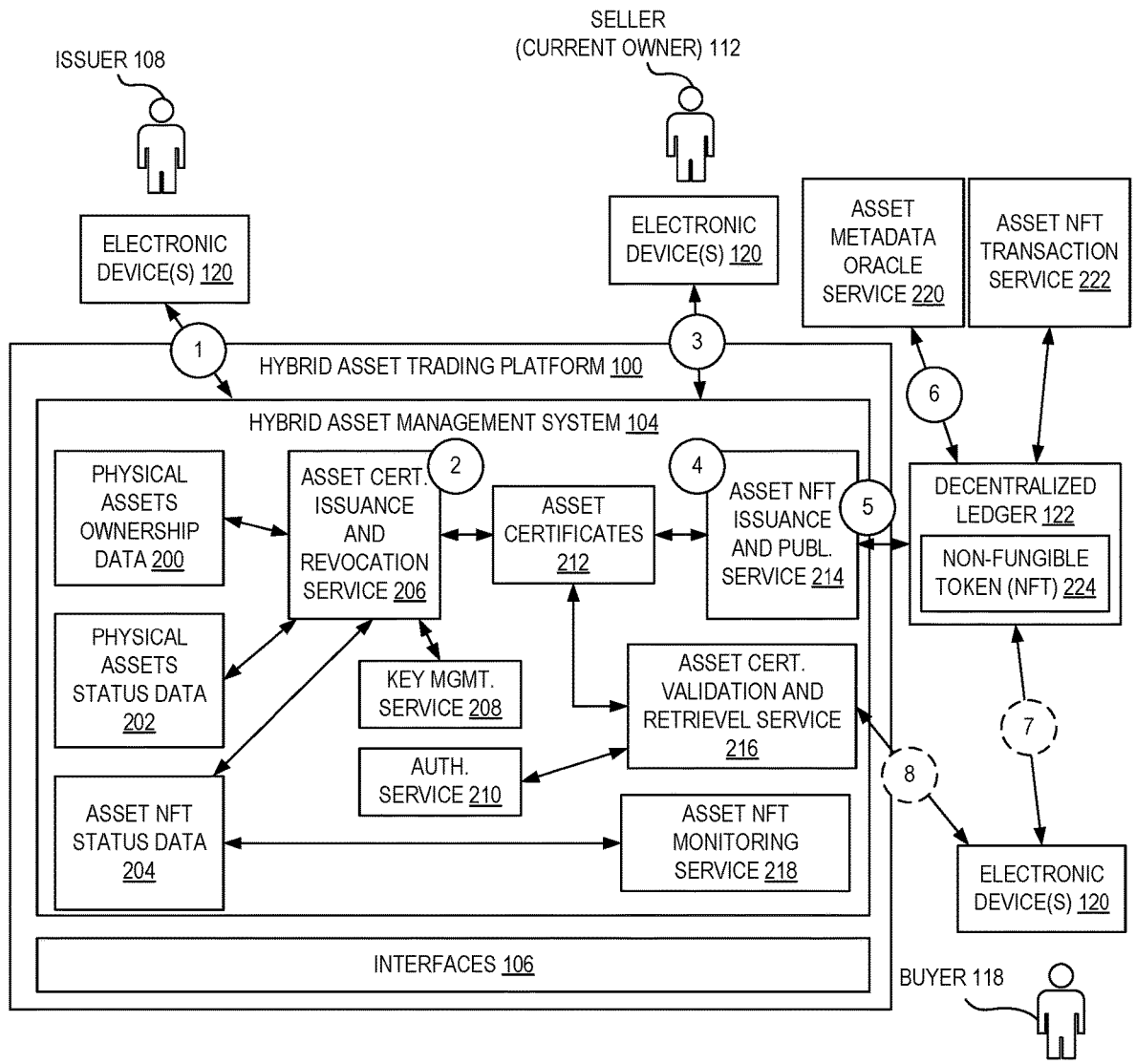
FIG. 3 illustrates an example process in which a hybrid asset management system issues hybrid asset certificates of legal ownership and corresponding asset NFTs on a decentralized ledger according to some examples.

FIG. 3 illustrates an example process in which a hybrid asset management system issues hybrid asset certificates of legal ownership and corresponding asset NFTs on a decentralized ledger according to some examples. In some examples, the process illustrated in FIG. 3 includes, at circle "1", an issuer 108 uses a computing device 120 to request the creation of a digital asset certificate of legal ownership and corresponding NFT (e.g., using a web-based console, API, or other interface 106 provided by the hybrid asset management system 104). In this example, it is assumed that a user has registered the corresponding physical asset with the hybrid asset management system 104 and the system stored data identifying the physical asset in physical assets ownership data 200. In the example of FIG. 3, it is further assumed that a custodian 110 or other user has used a computing device to register a location of the physical asset (e.g., in physical storage associated with a custodian) and the hybrid asset management system 104 stored data identifying the physical location in physical assets status data 202. In some examples, the hybrid asset management system 104 confirms that the data exists in the physical assets ownership data 200 and the physical assets status data 202 and, if unable to locate the data, prompts the issuer to first ensure that the physical asset and its location are registered.

In some examples, at circle "2", the asset certificate issuance and revocation service 206 creates the digital asset certificate of legal ownership corresponding to the hybrid asset requested for registration. For example, responsive to the request at circle "1," the asset certificate issuance and revocation service 206 of the hybrid asset management system 104 creates a new asset certificate 212. In some examples, the hybrid asset management system 104 digitally signs the asset certificate 212. The signed asset certificate is then stored as part of asset certificates 212. In some examples, an asset certificate of legal ownership includes, among other possible data, information identifying the physical asset and its physical location, an issuance date of the certificate, a validity duration for the asset certificate, the identity of the issuer 108, and a digital signature associated with the hybrid asset management system 104.

In some examples, at circle "3," the hybrid asset management system 104 provides the issuer 108 (shown also as seller 112, where the issuer 108 and the seller 112 can initially be the same entity) with a copy of the signed asset certificate. For example, the hybrid asset management system 104 can provide the signed asset certificate via a web-based console, client/server application, etc., where the issuer/seller can obtain the signed asset certificate over a secure network connection. In the case of "keyed" asset certificate, as described elsewhere herein, the resulting signed asset certificate further includes a proof-of-possession public key associated with the asset certificate. In some examples, the hybrid asset management system 104 returns a copy of the proof-of-possession private key to the issuer 108 when the hybrid asset management system 104 completes the signing of the asset certificate (e.g., via a web-based console, application etc.).

Once the signed asset certificate is stored in a database or other data store as part of asset certificates 212, at circle "4," the asset NFT issuance and publishing service 214 uses the asset certificate to create a matching asset NFT 224. In some examples, the asset NFT 224 includes, among other possible data, the serial number of the corresponding asset certificate, the blockchain address or other identifier of the current owner of the NFT (which can be the issuer's blockchain address for newly introduced assets with no prior history), an issuance date, a validity duration, etc.

In some examples, at circle "5," the asset NFT issuance and publishing service 214 publishes the asset NFT to the decentralized ledger 122 (e.g., a blockchain), where the service address the NFT to the blockchain address of the issuer as the first owner of the asset NFT 224. Once the transaction settles (or "finalizes") on the decentralized ledger 122, the issuer becomes the owner of the asset NFT and is thus generally able to sell, trade, or otherwise transfer the NFT to other entities/users.

In some examples, when the hybrid asset management system 104 creates a new asset NFT on the decentralized ledger 122 (based on the corresponding asset certificate), the asset NFT issuance and publishing service 214 invokes an asset metadata oracle service 220 (e.g., a smart contract or other software-based service) to publish, at circle "6," asset status metadata onto the same decentralized ledger 122. In some examples, an intended consumer of this metadata is the asset NFT transaction service 222 (e.g., a separate smart contract or other software-based service) on behalf of a seller 112 and buyer 118 involved in a transaction. In some examples, at circle "7" and circle "8," a potential buyer 118 can optionally validate a status of the asset NFT 224 and a corresponding asset certificate 212 via the decentralized ledger 122 storing the NFT 224 and the asset certificate validation and retrieval service 216.

For example, when a potential buyer 118 of an NFT 224 seeks to evaluate a given hybrid asset (e.g., prior to purchasing or otherwise obtaining the NFT), the buyer 118 can first use an application running on a client device 120 to read the asset NFT 224 from the decentralized ledger 122 and evaluate the information contained in the asset NFT. In particular, the potential buyer 118 can check the legal status of the asset certificate matching the asset NFT by using the serial number (of the asset certificate) which is included in the asset NFT.

Since asset certificates are located off-chain (e.g., stored by the hybrid asset management system 104 in a private data store), a buyer 118 can validate the status of the asset certificate via the hybrid asset management system 104. As shown at circle "8" in FIG. 3, queries to the hybrid asset management system 104 based on serial numbers of asset certificates are handled by the asset certificate validation and retrieval service 216. Note that the potential buyer at this point may not have access to the full asset certificate but rather only to the serial number of the asset certificate, which is found within the asset NFT 224 on the decentralized ledger 122. Since the potential buyer 117 is requesting private confirmation from the hybrid asset management system 104, in some examples, the buyer 118 first authenticates a user account associated with the buyer using the authorization service 210 (e.g., by providing a username and password or other credentials). Once a potential buyer 118 obtains an authorization ticket from the authorization service (e.g., based on a successful authentication), the potential buyer 118 can use a client application to generate a request to the asset certificate validation and retrieval service 216, where the request includes the certificate serial number and the authorization-ticket.

In some examples, responsive to a request to obtain information associated with an identified asset certificate, the asset certificate validation and retrieval service 216 can respond in several different ways including: (i) positive confirmation that the asset certificate is valid; (ii) negative confirmation, namely, that the asset certificate has been revoked; or (iii) a "status unknown" message indicating that the asset certificate validation and retrieval service 216 is unable to obtain status information or otherwise determines to withhold information.

Structure of the Asset Certificates and Asset NFTs

Figure 4:
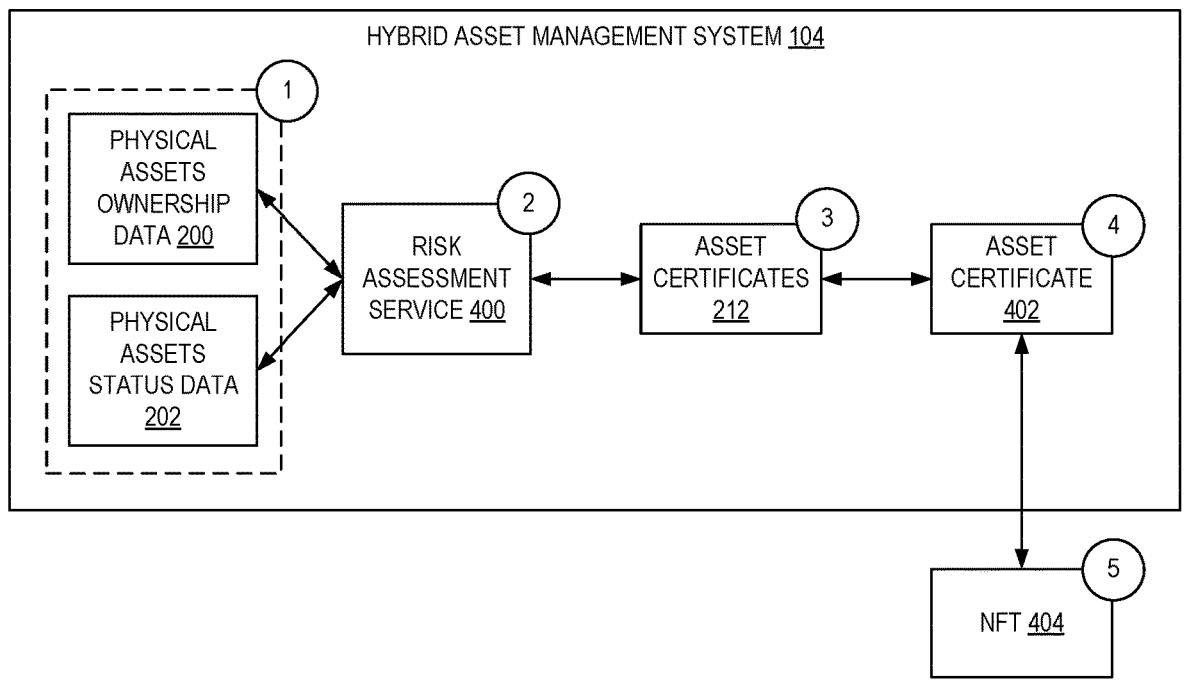
FIG. 4 illustrates additional details related to relationships among asset certificates and asset NFTs according to some examples.

FIG. 4 illustrates additional details related to relationships among asset certificates and asset NFTs according to some examples. As indicated, in some examples, the hybrid asset management system 104 can create an asset certificate 402 based on a combination of information stored as part of physical assets ownership data 200 (e.g., related to ownership information for a corresponding physical asset) and as part of physical assets status data 202 (e.g., indicating a status of the corresponding physical asset). This data is shown, for example, in relation to circle "1" in FIG. 4.

In some examples, a hybrid asset management system 104 can invoke a risk assessment service 400 to determine whether to proceed with the creation of a request asset certificate. If the risk assessment service 400 determines, based on the relevant physical assets ownership data 200 and physical assets status data 202, to proceed, the risk assessment service 400 stores, at circle "3," the relevant data regarding the asset certificate as part of asset certificates 212 (which can be a protected database or other data store managed by the hybrid asset management system 104).

In some examples, a given asset certificate (e.g., an asset certificate 402) includes data fields storing data about a corresponding hybrid asset, where such data is obtained from the asset certificates 212 data store. For example, the assets certificates 212 data store includes a complete data set used determine the creation of the asset certificate 402. Thus, at circle "4," the asset certificate can thus be considered to reference the asset certificates 212 data as the authoritative source of information regarding the asset certificate 402.

In some examples, a signed asset certificate exists prior to the creation of its matching asset NUT 404, shown as circle "5" in FIG. 4. For example, because an asset NFT includes information copied from the signed asset certificate, such as the certificate serial number or other identifier of the corresponding certificate of ownership data, the creation of the asset NFT can follow the creation of the corresponding asset certificate. Thus, the timestamp on an asset NFT is generally after (i.e., more recent in time) than the timestamp on the matching asset certificate.

Asset Certificates

In some examples, an asset certificate of ownership data, which can be a file, database record, or any other type of data structure, includes some or all the following data items. In some examples, certificate of ownership data includes a serial number identifying the first certificate of ownership data. For example, the hybrid asset management system 104 can generate a number, alphanumeric identifier, or any other type of identifier used to refer to the first certificate of ownership data. In some examples, the first certificate of ownership data further includes a cryptographic one-way hash of an internal index number used by the physical assets ownership data 200. This hash value can be used, for example, for local identification of the asset certificate of ownership by the hybrid asset management system 104.

In some examples, certificate of ownership data further includes an identifier of a current owner of a corresponding hybrid asset. For a new hybrid asset that has yet been issued an asset certificate, the owner can be the issuer entity. In some examples, certificate of ownership data further includes a blockchain address or other identifier of an owner's relevant to a decentralized ledger 122. For example, the address can be a blockchain address (e.g., a blockchain public key) of the current owner of the hybrid asset.

In some examples, certificate of ownership data includes a proof-of-possession public key. For example, for a "keyed" asset certificate, the proof-of-possession public key is the public key associated with this asset certificate. The key pair for each asset certificate is generated by the hybrid asset management system 104, where the hybrid asset management system 104 securely provides the proof-of-possession private key to the owner of the hybrid asset (e.g., using a secure web-based portal, client application, or other interface supporting a secure network connection for transferring the public key). In some examples, the proof-of-possession public key can be used by the hybrid asset management system 104 to perform a challenge-response authentication with the current holder of the asset certificate. This field may not be used in the case of plain (or non-keyed) asset certificate).

In some examples, certificate of ownership data further includes a date and time of the creation of the asset certificate, a duration of validity of the asset certificate, and an identifier of the entity that requested (e.g., using the hybrid asset management system 104) the registration of a hybrid asset resulting in the creation of this asset certificate (and corresponding asset NFT) for a hybrid asset.

In some examples, certificate of ownership data further includes a signing public key and signature algorithm used by hybrid asset management system 104. For example, this information can include a public key of the hybrid asset management system 104 used to sign this asset certificate of ownership data together with an algorithm identifier of the signature algorithm. The signature algorithm, for example, can be a standard algorithm (e.g., a National Institute of Standards and Technology-approved algorithm). The certificate of ownership data can further optionally include a signature portion including a digital signature over some or all the above-mentioned fields.

Asset NFTs

An asset NFT generated and published by a hybrid asset management system 104 can further include several data fields. In some examples, the data fields of an asset NFT can include a serial number identifying the NFT (e.g., generated by the hybrid asset management system 104), the serial number of the corresponding asset certificate of ownership data (e.g., as generated above by the hybrid asset management system 104), and a hash of a previous asset NFT, if it exists. If an asset NFT is a fresh (e.g., has not yet been involved in a transaction from one party to another), the data field containing a hash of a previous asset NFT can be empty or null.

In some examples, an asset NFT can further include a blockchain address (e.g., a blockchain public key) or other decentralized ledger-based identifier of the current owner of the asset NFT (and, by implication, the asset certificate). An NFT can further include a date and time of the creation of the asset NFT and a digital signature over some or all the above fields.

Trading of Asset NFT

When a current owner of a hybrid asset desires to sell, trade, or other transfer ownership of a hybrid asset to another entity, in some examples, the owner uses a client application to perform a transaction on a decentralized ledger 122 reflecting the transaction. For example, the example can be a client application provided by an operator of the hybrid asset management system 104, or any other application capable of generating and sending transaction requests and optionally to query the state of the ledger, invoke smart contracts, and the like.

Once the owner of a hybrid asset agrees to sell the hybrid asset to a buyer, in some examples, the asset NFT (corresponding to the hybrid asset) is assigned a new ownership by the owner to the buyer. For example, the owner (as seller) and the buyer can both use the asset NFT transaction service 222, where the service is owned by the hybrid asset management system 104 to facilitate the transaction. As indicated, in some examples, the asset NFT transaction service 222 can be a smart contract on a decentralized ledger 122; in other examples, the asset NFT transaction service 222 can be a software-based application or other executable code capable of managing transactions involving NFTs. In the example of a smart contract, a blockchain address of the asset NFT transaction service 222 belongs to the hybrid asset management system 104, reflecting that an operator of the hybrid asset management system 104 authored the smart contract. Thus, entities are not permitted to modify the code of the asset NFT transaction service 222 since the code is signed using the private key of the hybrid asset management system 104. As indicated, for any asset NFTs originating from the hybrid asset management system 104, transactions involving the asset NFTs are to be accomplished using the asset NFT transaction service 222.

In some examples, an operator of the hybrid asset management system 104 further provides the asset metadata oracle service 220. The asset metadata oracle service 220 records relevant asset status metadata regarding hybrid assets managed by the hybrid asset management system 104 onto the decentralized ledger 122 in in coordination with the asset NFT transaction service 222, as described in more detail herein. In some examples, the asset status metadata generated and recorded by the asset metadata oracle service 220 provides confirmation from the hybrid asset management system 104 that a physical asset (e.g., a component of the hybrid asset) is in a known physical state, under the control of known entity, and therefore is in condition to be sold, traded, or otherwise for ownership of the hybrid asset to be transferred from one entity to another.

In some examples, the asset NFT transaction service 222 depends on the correct status metadata for a given asset such that the asset NFT transaction service 222 may not proceed with a transaction if the asset NFT transaction service 222 is unable to find status metadata recorded on the decentralized ledger 122 with an acceptably recent date. The "freshness" or recency of a status metadata record on the decentralized ledger 122 is defined to be an amount of time between the current time (e.g., when the asset NFT transaction service 222 is invoked) and the timestamp of the last status metadata record on the decentralized ledger 122. The asset NFT transaction service 222 can define a required freshness time for completing a transaction based on the particular implementation, where the required freshness time can be modified by an operator of the hybrid asset management system 104 if desired. In some examples, if a potential buyer of a hybrid asset desires recently provided assurance of the status of a hybrid asset, the buyer can optionally request the asset NFT issuance and publishing service 214 via the appropriate APIs to generate a new status metadata for the asset onto the decentralized ledger 122.

When a change of ownership to an asset NFT has occurred on the decentralized ledger 122 (e.g., based on a successful transaction performed by the asset NFT transaction service 222), in some examples, an asset NFT monitoring service 218 can generate data reflecting a change to the corresponding NFT and store the data in the asset NFT status data 204. In some examples, the update to the data in the asset NFT status data causes the asset certificate issuance and revocation service 206 to revoke the existing asset NFT and issue a new asset NFT with the identity of the new owner.

Figure 5:
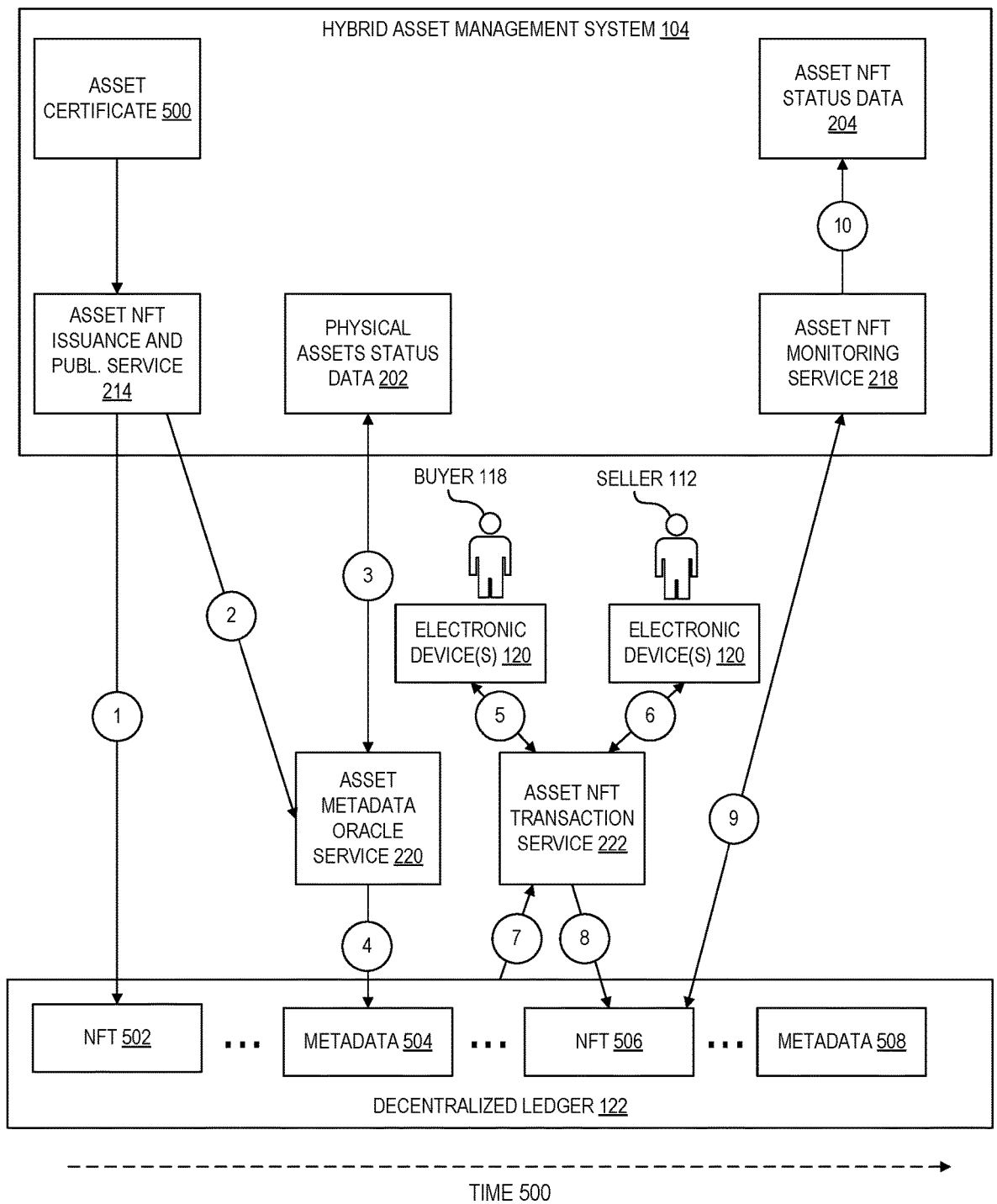
FIG. 5 illustrates an example process used by a hybrid asset trading platform to facilitate a transaction involving a hybrid asset according to some examples.

FIG. 5 illustrates an example process used by a hybrid asset trading platform to facilitate a transaction involving a hybrid asset according to some examples. In FIG. 5, the numbered circles "1"-"10" are used to describe an example process, where circles "1"-"4" are similar to the processes described above. In some examples, at circle "1," the asset NFT issuance and publishing service 214 creates an asset certificate 500 and a corresponding asset NFT 502 responsive to a request from a user to register a hybrid asset. As described above, the asset certificate 500 and corresponding asset NFT 502 each includes an identifier of an initial owner of a physical item corresponding to the certificate and NFT. Furthermore, the NFT includes an identifier of the corresponding asset certificate 500.

In some examples, at circle "2," the asset NFT issuance and publishing service 214 invokes the asset metadata oracle service 220, thereby causing the asset metadata oracle service 220 to obtain data indicating a status of the corresponding physical item and to record data reflecting the status of the physical item onto the same decentralized ledger 122. In some examples, hybrid asset management system 104 provides the asset metadata oracle service 220 with a copy of the asset certificate as part of invoking the service, where the asset certificate can be used by the asset NFT transaction service 222 to obtain an identifier of the hybrid asset.

In some examples, at circle "3," the asset metadata oracle service 220 uses one or more data fields in the provided asset certificate to obtain data reflecting the status of the physical asset from the physical assets status data 202. For example, the asset metadata oracle service 220 can send a query to the hybrid asset management system 104 including a serial number or other identifier of the hybrid asset, and the hybrid asset management system 104 can use the identifier to query a database or other data store for current information about a status of the physical asset (e.g., as reported by an entity currently in possession of the physical asset via the hybrid asset management system 104). If the status of the physical asset is in condition for transferring ownership (e.g., the physical asset is in a known safe state, known custody, etc.), in some examples, the asset metadata oracle service 220 publishes metadata onto the decentralized ledger reflecting this information. For example, at circle "4," the asset metadata oracle service 220 writes a metadata record 504 onto the decentralized ledger 122, where the metadata record 504 includes information reflecting the status data obtained by the asset metadata oracle service 220 from the physical assets status data 202.

In some examples, at circle "5," a potential buyer 118 seeking to purchase a given hybrid asset initiates the transaction by invoking the asset NFT transaction service 222 and indicating a desire to purchase the asset NFT corresponding to that hybrid asset. In some examples, the asset NFT transaction service 222 is a smart contract associated with the decentralized ledger 122. In other examples, the asset NFT transaction service 222 is a software-based service or application running on computing resources managed by the hybrid asset management system 104. In some examples, invoking the asset NFT transaction service 222 includes the buyer 118 using a computing device to provides an identifier of the relevant asset NFT 502 (e.g., by providing as input the serial number of the asset NFT). If the seller (i.e., the current owner of the asset NFT and corresponding hybrid asset) agrees to the purchase (e.g., based on the seller using a computing device to provide input to the asset NFT transaction service 222 indicating their consent to the transaction), at circle "6," the seller 112 using a client computing device 120 to sign an approval using the seller's private key.

In some examples, responsive to the input from the buyer and seller as described above, at circle "7," the asset NFT transaction service 222 searches through the confirmed (or settled) records on the decentralized ledger 122 for the most recent asset status metadata record identifying the hybrid asset (e.g., metadata record 504). The asset NFT transaction service 222 can perform the search, for example, using the serial number of the asset certificate included in the asset NFT 502. If the asset NFT transaction service locates the most recent asset stats metadata record (e.g., metadata record 504), and if a timestamp/date on that record is recent enough, e.g., to satisfy any date policy enforced by the asset NFT transaction service 222, the service proceeds to execute the transaction to completion.

In some examples, after the smart contract executes successfully, at circle "8," the asset NFT transaction service 222 publishes a new NFT 506 that is assigned to the buyer 118 (e.g., by assigning the NFT 506 to the buyer's blockchain address or otherwise identifying the buyer 118).

In some examples, at circle "9," an asset NFT monitoring service 218 detects the new asset NFT being created by the smart contract, assigned from the old owner to the new owner. For example, the asset NFT monitoring service 218 can continuously or periodically scan records on the decentralized ledger 122 for any NFTs identifying an asset managed by the hybrid asset management system 104 (e.g., based on a serial number or other identifying information included in the NFTs). Upon detecting a new asset NFT 506, at circle "10," the asset NFT monitoring service 218 stores information related to the new asset NFT 506 to the asset NFT status data 204. In some examples, the storing of information related to the new asset NFT 506 causes the hybrid asset management system 104 to revoke the previous corresponding asset certificate and to create a new asset certificate assigned to the new owner (i.e., the new owner of the asset NFT 506). As shown, at some point later in time, additional metadata 508 may be obtained and stored on the decentralized ledger 122 reflecting any update to a physical status of a corresponding physical item (e.g., as a result of transferring ownership of the hybrid asset).

Composite Asset NFTs

Figure 6:
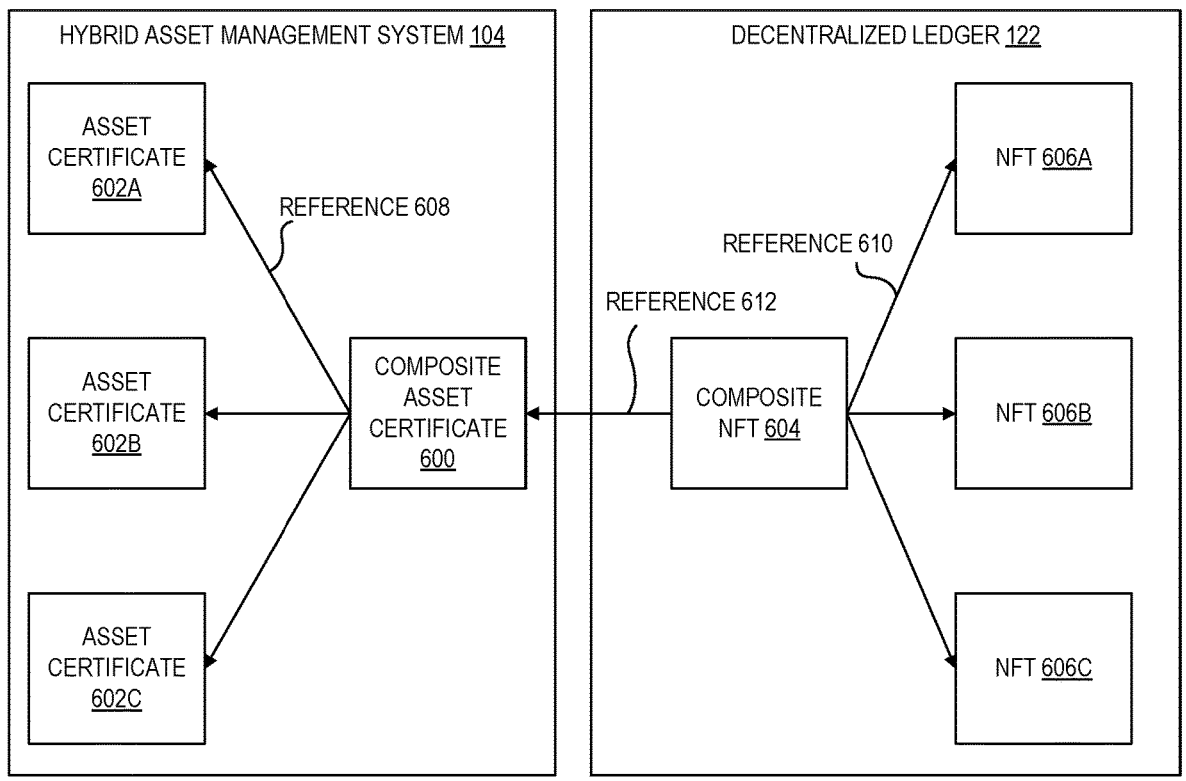
FIG. 6 is a diagram illustrates an example of relationships among a collection of asset certificates and NFTs representing a composite asset according to some examples according to some examples.

FIG. 6 illustrates an example of relationships among a collection of asset certificates and NFTs representing a composite asset according to some examples. In some examples, a composite asset NFT is a collection of asset NFTs which satisfy some conditions. For example, the conditions can include that a corresponding set of asset certificates (and a composite asset certificate) corresponding to the composite asset NFT are owned by the same entity. Furthermore, in some examples, any asset NFTs of a composite asset NFT (and a composite asset NFT representing the collection) are owned by the same entity. In some examples, a change of ownership (e.g., via a transaction facilitated by the hybrid asset management system 104) of a composite asset NFT results in the change of ownership of the composite asset certificate, and vice versa. For example, a change of ownership of a composite asset NFT results in the change of ownership of any related asset NFTs. Similarly, a change of ownership of a composite asset certificate results in the change of ownership of any related asset certificates. In some examples, there is only one composite asset certificate for the composite asset NFT, and vice versa.

In FIG. 6, a composite asset certificate 600 is shown in connection with a corresponding composite NFT (e.g., where the composite NFT 604 includes a reference 612 to the corresponding composite asset certificate 600). As shown, the composite asset certificate 600 further includes references (e.g., a reference 608) to two or more constituent asset certificates (e.g., references to an asset certificate 602A, asset certificate 602B, and asset certificate 602C). Similarly, the composite NFT 604 includes references (e.g., a reference 610) to two or more constituent NFTS (e.g., references to an NFT 606A, NFT 606B, and NFT 606C). As in the previously indicated, an asset certificate typically exists prior to the creation of a corresponding asset NFT such that the NFT can include an identifier of the composite asset certificate generated by the hybrid asset management system 104.

When the owner of N distinct asset NFTs desires to create a composition using those asset NFTs, in some examples, in some examples, the owner invokes a service (e.g., a smart contract) associated with the decentralized ledger 122 referred to as a composing/decomposing service. Upon receiving a request, the composing/decomposing service can create a composite asset NFT on the decentralized ledger 122 referencing each component asset NFT belonging to the same owner. Similarly, if an owner of a composite asset NFT seeks to decompose a composite asset NFT into several independent asset NFTs, the owner can use the composing/decomposing service to deference the component asset NFTs. A successful decomposition request on a composite asset NFT, for example, results in the assignment on the decentralized ledger 122 of the composite asset NFT to a "null" address, thereby signifying its destruction and the revocation of the corresponding composite asset certificate (e.g., in a separate data store).

Figure 7:
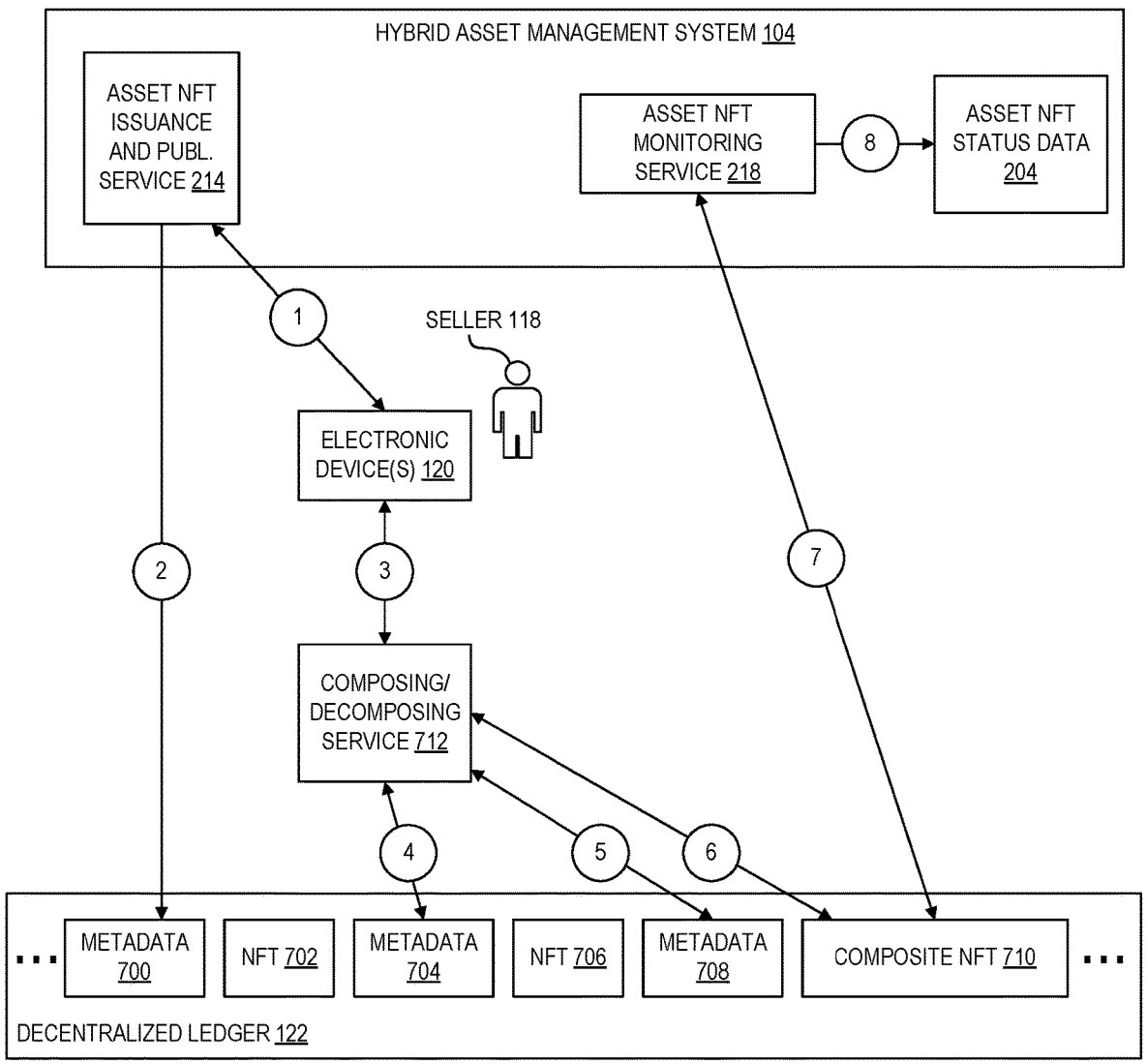
FIG. 7 is a diagram illustrating a computer-implemented system in which a hybrid asset trading platform facilitates a transaction involving a composite hybrid asset according to some examples.

FIG. 7 is a diagram illustrating a computer-implemented system in which a hybrid asset trading platform facilitates a transaction involving a composite hybrid asset according to some examples. At circle "1," in some examples, when the owner of a bundle of asset certificates seeks to create a composite asset certificate representing a collection of NFTs, the owner uses a client computing device to initiate the request via the hybrid asset management system 104. At circle "2," in some examples, responsive to receiving a request to register a composite asset, the asset NFT issuance and publishing service 214 creates a composite asset certificate (e.g., to be stored as part of asset certificates 212) and sends a response including a copy of the composite asset certificate to the requesting client device. The asset NFT issuance and publishing service 214 can further record metadata 700 onto the decentralized ledger, where the metadata 700 includes information about the generated composite asset certificate.

In some examples, when the owner of a composite asset certificate seeks to create a matching composite asset NFT, at circle "3", the user (e.g., a seller 112) uses a client computing device 120 to invoke the composing/decomposing service 712 to request the creation of a composite asset NFT. As part of generating the request, the owner provides serial numbers of each of the asset NFTs to be included as part of the composite asset NFT.

In some examples, at circle "4" and circle "5," the composing/decomposing service 712 validates the status of each of the provided serial numbers for the NFTs (including, e.g., an NFT 702, NFT 706, among any number of additional NFTs identified by the seller) by reading the relevant metadata from the decentralized ledger (e.g., metadata 704). If each metadata (corresponding to each asset certificate) reports the correct status of each asset certificate, in some examples, the composing/decomposing service 712 proceeds, at circle "6," with creating a composite NFT 710.

In some examples, at circle "7," the asset NFT monitoring service 218 identifies the publication of a new composite asset NFT by the composing/decomposing service 712 (based on an identifier included in the composite NFT 710). The asset NFT monitoring service 218, at circle "8," stores an update as part of asset NFT status data 204 reflecting the publishing of the composite NFT 710.

EXAMPLES

In some examples, the described hybrid asset management system 104 enables the digital representation of real-world physical assets using a combination of an asset certificate of legal ownership and asset non-fungible token (NFT), where the asset NFT is cryptographically linked to the asset certificate. This combination of a certificate of legal ownership and NFT can be referred to as a hybrid asset, where the asset certificate of legal ownership is maintained in a private data repository and the asset NFT is made available on a permissionless or permissioned decentralized ledger. When a transaction involving a hybrids asset is performed, in some examples, the transaction occurs on the decentralized ledger to the asset NFT. Similarly, a change of ownership of the asset NFT on the blockchain results in the corresponding change of the information in the private asset certificate.

In some examples, the hybrid asset management system 104 provides services enabling the system to issue and manage authorization tickets that provide access to the private asset certificates bound to an asset NFT. The entity requesting access to the asset certificate, for example, presents the asset NFT including the serial number of the asset certificate. After the entity is identified and authenticated by the hybrid asset management system 104 (e.g., using an identity management system 102), the current owner of the hybrid asset can approve or deny the request to access to the private asset certificate.

A method to manage asset certificates in the case of a change of ownership to a given asset NFT on the blockchain. When the owner of an hybrid asset sells the corresponding asset NFT (representing the hybrid asset) to a buyer on the decentralized ledger 122, the hybrid asset management system 104 replaces the matching asset certificate (stored in a separate data repository) with a new asset certificate issued to the buyer. In some examples, the replacement asset certificate carries the same serial number but contains the identity information of the buyer. The buyer can obtain a copy of the asset certificate through a private and secure channel established by the hybrid asset management system 104. In some examples, the replacement of the assert certificate includes the hybrid asset management system 104 revoking the previous asset certificate.

In some examples, the hybrid asset trading platform enables the authentication with the holder (and owner) of an asset certificate by incorporating a proof-of-possession public key inside the asset certificate. The proof-of-possession key pair is generated by the hybrid asset management system 104 signing the asset certificate, where the private key of the proof-of-possession key pair can be delivered through a secure and authenticated channel to the owner of the hybrid asset, thereby ensuring that only the owner knows this proof-of-possession private key. When the owner of a hybrid asset is challenged to prove it is the legal owner of the hybrid asset, in some examples, the asset management system utilizes the known public-key to encrypt a random string and sends the ciphertext to the owner. The owner is able to decrypt the ciphertext, obtain the random string, and replay the string back to the asset management system by signing the plaintext random string.

In some examples, the hybrid asset management system enables providing off-chain status information onto a decentralized ledger regarding a real-world physical asset that is part of a hybrid asset, which is represented on the decentralized ledger as an asset NFT. In some examples, the process includes using an asset metadata oracle service 220 along with an asset NFT transaction service 222 (which can be implemented as smart contracts or other executable software), where the asset NFT transaction service 222 executes trades on the decentralized ledger (from a current owner of an asset NFT to a buyer) if the asset status metadata provided by the asset metadata oracle service 220 indicates that the physical asset is in a safe condition (e.g., ready to be delivered in the real-world to the buyer). This can prevent, e.g., an Owner from selling an asset NFT to a buyer on the decentralized ledger but failing to deliver the physical asset in the real-world to the buyer.

In some examples, the hybrid asset management system 104 ensure the freshness or recentness of metadata information regarding the status of a hybrid asset recorded on a decentralized ledger. For example, the hybrid asset management system 104 can invoke an API on a verification service that verifies the physical status of the hybrid asset which is located off-chain. The status information regarding the physical asset (part of the hybrid asset) includes its known physical state, its physical location, and whether it is under the control of a legal custody. The verification service reports on this status by recording the information on the decentralized ledger 122.

In some examples, the hybrid asset management system 104 facilitates the propagation of changes on an asset NFT on a decentralized ledger to its corresponding asset certificate that is stored off-chain. For example, an asset NFT monitoring service 218 can perform a continual scan of new records/blocks on the decentralized ledger and can detect NFTs that are related to hybrid assets that the service is designated to monitor (e.g., hybrid assets registered with the system and containing a unique identifier that can be included in corresponding NFTs). When an asset NFT changes ownership on the decentralized ledger, in some examples, the asset NFT monitoring service 218 reports this fact, resulting to a new asset certificate being created off-chain (and the old asset certificate being revoked).

In some examples, the hybrid asset management system 104 enables the creation and management of composite hybrid assets, which consist of multiple independent asset certificates and corresponding asset NFTs belonging to a same owner. In some examples, there exists only one composite asset certificate for a composite asset NFT, and vice versa. A change of ownership (e.g., through a sale, trade, or other transaction) of a composite asset NFT results in the change of ownership of the composite asset certificate, and vice versa. A change of ownership of a composite asset NFT results in the change of ownership of related asset NFTs. Similarly, a change of ownership of a composite asset certificate results in the change of ownership of related asset certificates.

In some examples, when the owner of distinct asset NFTs desires to create a composite hybrid asset using those asset NFTs, the owner can use a composing/decomposing service 712 (e.g., which can be implemented as a smart contract on the decentralized ledger 122 in some examples, or as a software-based service or other application in other implementations). In some examples, a successful composition request results in: (i) the issuance of a new composite asset certificate (off-chain) by the asset NFT issuance and publishing service 214 (a copy of which can be delivered to the owner via a secure channel); and (ii) the issuance of a composite asset NFT on the decentralized ledger 122 referencing each component asset NFT belonging to the same owner. A successful decomposition request on a composite asset NFT, in some examples, results in the assignment of the composite asset NFT on the decentralized ledger to a "null" address signifying its destruction, and the revocation of the corresponding composite asset certificate.

Figure 8:
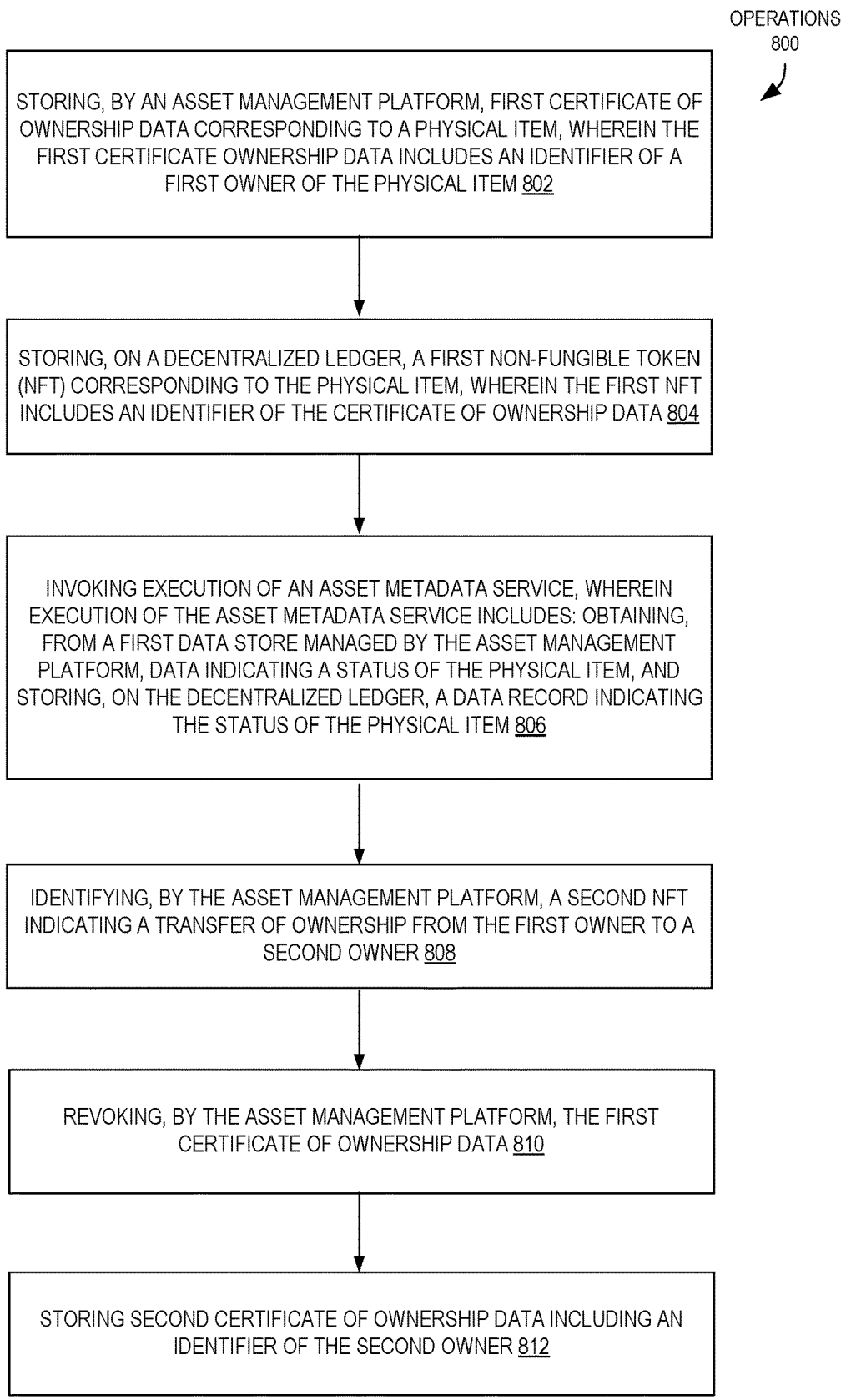
FIG. 8 is a flow diagram illustrating operations for providing a secure hybrid asset trading platform enabling transactions involving assets comprising both digital and physical components according to some examples.

FIG. 8 is a flow diagram illustrating operations 800 of a method for providing an asset trading protocol involving asset instances used in one or more metaverses according to some examples. Some or all the operations 800 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 800 are performed by an hybrid asset management system 104 of the other figures.

The operations 800 include, at block 802, storing, by an asset management platform, first certificate of ownership data corresponding to a physical item, wherein the first certificate of ownership data includes an identifier of a first owner of the physical item.

The operations 800 further include, at block 804, storing, on a decentralized ledger, a first non-fungible token (NFT) corresponding to the physical item, wherein the first NFT includes an identifier of the first certificate of ownership data.

The operations 800 further include, at block 806, invoking execution of an asset metadata service, wherein execution of the asset metadata service includes: obtaining, from a first data store managed by the asset management platform, data indicating a status of the physical item, and storing, on the decentralized ledger, a data record indicating the status of the physical item.

The operations 800 further include, at block 808, identifying, by the asset management platform, a second NFT indicating a transfer of ownership from the first owner to a second owner.

The operations 800 further include, at block 810, revoking, by the asset management platform, the first certificate of ownership data.

The operations 800 further include, at block 812, storing second certificate of ownership data including an identifier of the second owner.

In some examples, invoking execution of the asset metadata service includes providing a copy of the first certificate of ownership data, wherein the asset metadata service uses the first certificate of ownership data to obtain, from the first data store managed by the asset management platform, the data indicating the status of the physical item.

In some examples, execution of the asset metadata service further includes determining, based on the data indicating a status of the physical item, that the status is in condition for transferring ownership.

In some examples, the physical item is a luxury item, wherein the luxury item includes tamper-resistant microchip embedded in the physical item, and wherein the tamper-resistant microchip stores a digital certificate identifying the asset management platform.

In some examples, the asset metadata service includes a smart contract associated with the decentralized ledger.

In some examples, the operations further include receiving, via an interface provided by the asset management platform, a request to register a hybrid asset comprising the physical item, the first NFT, and the first certificate of ownership data In some examples, the operations further include storing, at the decentralized ledger, updated status metadata, wherein the updated status metadata includes information reflecting the transfer of ownership from the first owner to the second owner.

In some examples, wherein an asset transaction service uses the metadata to determine whether a transfer of ownership from the first owner to the second owner is permissible.

In some examples, the NFT is a composite asset NFT representing a plurality of NFTs, wherein the first certificate of ownership data is composite certificate of ownership data representing a plurality of certificates of ownership data, and wherein the composite asset NFT includes a reference to the composite certificate of ownership data.

In some examples, the first certificate of ownership data includes a proof-of-possession public key, wherein a proof-of-possession key pair including the proof-of-possession public key and a corresponding proof-of-possession private key is generated by the asset management platform.

Implementation Mechanism—Hardware Overview

According to one example, the techniques described herein (e.g., related to the hybrid asset management system 104 and other components) are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

FIG. 9 is a block diagram that illustrates a computer system 900 utilized in implementing the above-described techniques, according to an example. Computer system 900 may be, for example, a desktop computing device, laptop computing device, tablet, smartphone, server appliance, computing mainframe, multimedia device, handheld device, networking apparatus, or any other suitable device.

Computer system 900 includes one or more buses 902 or other communication mechanism for communicating information, and one or more hardware processors 904 coupled with buses 902 for processing information. Hardware processors 904 may be, for example, general purpose microprocessors. Buses 902 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 900 also includes a main memory 906, such as a random access memory (RAM) or other dynamic or volatile storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 a special-purpose machine that is customized to perform the operations specified in the instructions.

Computer system 900 further includes one or more read only memories (ROM) 908 or other static storage devices coupled to bus 902 for storing static information and instructions for processor 904. One or more storage devices 910, such as a solid-state drive (SSD), magnetic disk, optical disk, or other suitable non-volatile storage device, is provided and coupled to bus 902 for storing information and instructions.

Computer system 900 may be coupled via bus 902 to one or more displays 912 for presenting information to a computer user. For instance, computer system 900 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 912 may include, without limitation, plasma display devices, projectors, cathode ray tube (CRT) monitors, electronic paper, virtual reality headsets, braille terminal, and/or any other suitable device for outputting information to a computer user. In an example, any suitable type of output device, such as, for instance, an audio speaker or printer, may be utilized instead of a display 912.

One or more input devices 914 are coupled to bus 902 for communicating information and command selections to processor 904. One example of an input device 914 is a keyboard, including alphanumeric and other keys. Another type of user input device 914 is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Yet other examples of suitable input devices 914 include a touch-screen panel affixed to a display 912, cameras, microphones, accelerometers, motion detectors, and/or other sensors. In an example, a network-based input device 914 may be utilized. In such an example, user input and/or other information or commands may be relayed via routers and/or switches on a Local Area Network (LAN) or other suitable shared network, or via a peer-to-peer network, from the input device 914 to a network link 920 on the computer system 900.

A computer system 900 may implement techniques described herein using customized hard-wired logic, one or more ASICs or FPGAs, firmware and/or program logic which in combination with the computer system causes or programs computer system 900 to be a special-purpose machine. According to one example, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative examples, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or a solid-state drive of a remote computer. The remote computer can load the instructions into its dynamic memory and use a modem to send the instructions over a network, such as a cable network or cellular network, as modulate signals. A modem local to computer system 900 can receive the data on the network and demodulate the signal to decode the transmitted instructions. Appropriate circuitry can then place the data on bus 902. Bus 902 carries the data to main memory 906, from which processor 904 retrieves and executes the instructions. The instructions received by main memory 906 may optionally be stored on storage device 910 either before or after execution by processor 904.

A computer system 900 may also include, in an example, one or more communication interfaces 918 coupled to bus 902. A communication interface 918 provides a data communication coupling, typically two-way, to a network link 920 that is connected to a local network 922. For example, a communication interface 918 may be an integrated services digital network (ISDN) card, cable modem, satellite modem, or a modem to provide a data communication connection to a corresponding type of telephone line. As another example, the one or more communication interfaces 918 may include a local area network (LAN) card to provide a data communication connection to a compatible LAN. As yet another example, the one or more communication interfaces 918 may include a wireless network interface controller, such as a 802.11-based controller, Bluetooth controller, Long Term Evolution (LTE) modem, and/or other types of wireless interfaces. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by a Service Provider 926. Service Provider 926, which may for example be an Internet Service Provider (ISP), in turn provides data communication services through a wide area network, such as the worldwide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

In an example, computer system 900 can send messages and receive data, including program code and/or other types of instructions, through the network(s), network link 920, and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution. As another example, information received via a network link 920 may be interpreted and/or processed by a software component of the computer system 900, such as a web browser, application, or server, which in turn issues instructions based thereon to a processor 904, possibly via an operating system and/or other intermediate layers of software components.

In an example, some or all of the systems described herein may be or comprise server computer systems, including one or more computer systems 900 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an example, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an example, the cloud-based components may be implemented by third-party entities, on behalf of another entity for whom the components are deployed. In other examples, however, the described systems may be implemented entirely by computer systems owned and operated by a single entity.

In an example, an apparatus comprises a processor and is configured to perform any of the foregoing methods. In an example, a non-transitory computer readable storage medium, storing software instructions, which when executed by one or more processors cause performance of any of the foregoing methods.

Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, examples of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate examples are discussed herein, any combination of examples and/or partial examples discussed herein may be combined to form further examples.

Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
    storing, by an asset management platform, first certificate of ownership data corresponding to a physical item, wherein the first certificate of ownership data includes an identifier of a first owner of the physical item, wherein the physical item includes a tamper-resistant microchip embedded in the physical item, and wherein the tamper-resistant microchip stores a digital certificate identifying the asset management platform;
    storing, on a decentralized ledger, a first non-fungible token (NFT) corresponding to the physical item, wherein the first NFT includes an identifier of the first certificate of ownership data;
    invoking execution of an asset metadata service, wherein execution of the asset metadata service includes:
        obtaining, from a first data store managed by the asset management platform, data indicating a status of the physical item, wherein the status of the physical item includes at least one of: an identifier of a physical location of the physical item, or a custodian of the physical item, and
        storing, on the decentralized ledger, a data record indicating the status of the physical item;
    identifying, by the asset management platform, a second NFT indicating a transfer of ownership from the first owner to a second owner;
    revoking, by the asset management platform, the first certificate of ownership data; and
    storing second certificate of ownership data including an identifier of the second owner.

2. The computer-implemented method of claim 1, wherein invoking execution of the asset metadata service includes providing a copy of the first certificate of ownership data, wherein the asset metadata service uses the first certificate of ownership data to obtain, from the first data store managed by the asset management platform, the data indicating the status of the physical item.

3. The computer-implemented method of claim 1, wherein invoking execution of the asset metadata service further includes determining, based on the data indicating a status of the physical item, that the status is in condition for transferring ownership.

4. The computer-implemented method of claim 1, wherein the physical item is a luxury item.

5. The computer-implemented method of claim 1, wherein the asset metadata service includes a smart contract associated with the decentralized ledger.

6. The computer-implemented method of claim 1, further comprising receiving, via an interface provided by the asset management platform, a request to register a hybrid asset comprising the physical item, the first NFT, and the first certificate of ownership data.

7. The computer-implemented method of claim 1, further comprising storing, at the decentralized ledger, updated status metadata, wherein the updated status metadata includes information reflecting the transfer of ownership from the first owner to the second owner.

8. The computer-implemented method of claim 1, wherein an asset transaction service uses the metadata to determine whether a transfer of ownership from the first owner to the second owner is permissible.

9. The computer-implemented method of claim 1, wherein the NFT is a composite asset NFT representing a plurality of NFTs, wherein the first certificate of ownership data is composite certificate of ownership data representing a plurality of certificates of ownership data, and wherein the composite asset NFT includes a reference to the composite certificate of ownership data.

10. The computer-implemented method of claim 1, wherein the first certificate of ownership data includes a proof-of-possession public key, wherein a proof-of-possession key pair including the proof-of-possession public key and a corresponding proof-of-possession private key is generated by the asset management platform.

11. A system comprising:
    a first one or more electronic devices to implement an asset management platform, wherein the asset management platform includes instructions that upon execution cause the asset management platform to:
        store first certificate of ownership data corresponding to a physical item, wherein the first certificate of ownership data includes an identifier of a first owner of the physical item, wherein the physical item includes a tamper-resistant microchip embedded in the physical item, and wherein the tamper-resistant microchip stores a digital certificate identifying the asset management platform;
        store, on a decentralized ledger, a first non-fungible token (NFT) corresponding to the physical item, wherein the first NFT includes an identifier of the first certificate of ownership data;
        invoke execution of an asset metadata service to obtain a data record indicating a status of the physical item;
        identify, by the asset management platform, a second NFT indicating a transfer of ownership from the first owner to a second owner;
        revoke, by the asset management platform, the first certificate of ownership data; and
        store second certificate of ownership data including an identifier of the second owner; and
    a second one or more electronic devices to implement the asset metadata service, wherein the asset metadata service includes instructions that upon execution cause the asset metadata service to:
        obtain, from a first data store managed by the asset management platform, the data indicating the status of the physical item, wherein the status of the physical item includes at least one of: an identifier of a physical location of the physical item, or a custodian of the physical item, and
        store, on the decentralized ledger, a data record indicating the status of the physical item.

12. The system of claim 11, wherein invoking execution of the asset metadata service includes providing a copy of the first certificate of ownership data, wherein the asset metadata service uses the first certificate of ownership data to obtain, from the first data store managed by the asset management platform, the data indicating the status of the physical item.

13. The system of claim 11, wherein invoking execution of the asset metadata service further includes determining, based on the data indicating a status of the physical item, that the status is in condition for transferring ownership.

14. The system of claim 11, wherein the physical item is a luxury item.

15. The system of claim 11, wherein the asset metadata service includes a smart contract associated with the decentralized ledger.

16. A non-transitory computer-readable storage medium storing instructions which, when executed by one or more processors, cause performance of operations including:
    storing, by an asset management platform, first certificate of ownership data corresponding to a physical item, wherein the first certificate of ownership data includes an identifier of a first owner of the physical item;
    storing, on a decentralized ledger, a first non-fungible token (NFT) corresponding to the physical item, wherein the first NFT includes an identifier of the first certificate of ownership data, wherein the first NFT is a composite asset NFT representing a plurality of NFTs, wherein the first certificate of ownership data is composite certificate of ownership data representing a plurality of certificates of ownership data, and wherein the composite asset NFT includes a reference to the composite certificate of ownership data;
    invoking execution of an asset metadata service, wherein invoking execution of the asset metadata service includes:
        obtaining, from a first data store managed by the asset management platform, data indicating a status of the physical item, wherein the status of the physical item includes at least one of: an identifier of a physical location of the physical item, or a custodian of the physical item, and
        storing, on the decentralized ledger, a data record indicating the status of the physical item;
    identifying, by the asset management platform, a second NFT indicating a transfer of ownership from the first owner to a second owner;
    revoking, by the asset management platform, the first certificate of ownership data; and
    storing second certificate of ownership data including an identifier of the second owner.

17. The non-transitory computer-readable storage medium of claim 16, wherein invoking execution of the asset metadata service includes providing a copy of the first certificate of ownership data, wherein the asset metadata service uses the first certificate of ownership data to obtain, from the first data store managed by the asset management platform, the data indicating the status of the physical item.

18. The non-transitory computer-readable storage medium of claim 16, wherein invoking execution of the asset metadata service further includes determining, based on the data indicating a status of the physical item, that the status is in condition for transferring ownership.

19. The non-transitory computer-readable storage medium of claim 16, wherein the luxury item includes a tamper-resistant microchip embedded in the physical item, and wherein the tamper-resistant microchip stores a digital certificate identifying the asset management platform.

20. The non-transitory computer-readable storage medium of claim 16, wherein the asset metadata service includes a smart contract associated with the decentralized ledger.

* * * * *